(12) United States Patent　　(10) Patent No.:　　US 10,626,854 B2
Yagci　　(45) Date of Patent:　　Apr. 21, 2020

(54) DEVICE FOR FASTENING AND/OR GUIDING STRAND-SHAPED ELEMENTS

(71) Applicant: HYDAC ACCESSORIES GMBH, Sulzbach/Saar (DE)

(72) Inventor: Burhan Yagci, Sulzbach (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 101 days.

(21) Appl. No.: 15/759,548

(22) PCT Filed: Oct. 19, 2016

(86) PCT No.: PCT/EP2016/001730
§ 371 (c)(1),
(2) Date: Mar. 13, 2018

(87) PCT Pub. No.: WO2017/067658
PCT Pub. Date: Apr. 27, 2017

(65) Prior Publication Data
US 2019/0154008 A1　　May 23, 2019

(30) Foreign Application Priority Data
Oct. 22, 2015　(DE) .................. 10 2015 013 791

(51) Int. Cl.
*F03D 80/80*　　(2016.01)
*F16L 3/227*　　(2006.01)
(Continued)

(52) U.S. Cl.
CPC .............. *F03D 80/85* (2016.05); *F16L 3/105* (2013.01); *F16L 3/1058* (2013.01); *F16L 3/227* (2013.01);
(Continued)

(58) Field of Classification Search
CPC ........ H02G 3/32; H02G 3/0456; F03D 80/85; F16L 3/22; F16L 3/23
See application file for complete search history.

(56) References Cited

U.S. PATENT DOCUMENTS 2,650,948 A　　9/1953　Findlay
8,783,629 B2 *　7/2014　Even ....................... F03D 80/85
　　　　　　　　　　　　　　　　　　248/49

(Continued)

FOREIGN PATENT DOCUMENTS

DE　　　　　695 125　　　8/1940
DE　10 2010 032 686　　2/2012
(Continued)

OTHER PUBLICATIONS

International Search Report (ISR) dated Jan. 31, 2017 in International (PCT) Application No. PCT/EP2016/001730.

*Primary Examiner* — Eret C McNichols
(74) *Attorney, Agent, or Firm* — Wenderoth, Lind & Ponack, L.L.P.

(57) ABSTRACT

A device for fastening and/or guiding strand-shaped elements in wind turbines has a retaining body (1; 101) attachable to a carrier structure and a strand-receiving space (9; 109) as a bearing for at least one strand element introduced into it via an opening (29; 111) located on its outer side. The opening (29; 111) can be closed via a cover device (9; 117) having a pressure part (17; 129) movable into a clamping position via an energy storage (51; 137) to exert a retaining force within a clamping region on strand elements located in the strand-receiving space (9; 109). The cover device (9; 117) has a locking device (69; 141) via which the pressure part (17; 129) can be secured against a movement into the clamping position against the effect of the energy storage (51; 137) or released for a clamping movement.

20 Claims, 21 Drawing Sheets

(51) Int. Cl.
*F16L 3/23* (2006.01)
*F16L 3/10* (2006.01)
*H02G 3/32* (2006.01)
*H02G 3/04* (2006.01)

(52) U.S. Cl.
CPC .............. *F16L 3/23* (2013.01); *H02G 3/0456* (2013.01); *H02G 3/32* (2013.01); *Y02E 10/72* (2013.01)

(56) References Cited

U.S. PATENT DOCUMENTS

| | | | |
|---|---|---|---|
| 9,127,789 B2 * | 9/2015 | Caspari | ................... H02G 3/30 |
| 2008/0185183 A1 * | 8/2008 | Chen | ....................... H02G 3/32 |
| | | | 174/651 |
| 2010/0183396 A1 | 7/2010 | Schmidt | |
| 2015/0001354 A1 * | 1/2015 | Brabander | ........... H02G 3/0462 |
| | | | 248/69 |
| 2015/0211659 A1 * | 7/2015 | Even | ....................... H02G 3/32 |
| | | | 248/69 |

FOREIGN PATENT DOCUMENTS

| | | | | |
|---|---|---|---|---|
| DE | 102012001407 A1 * | 7/2013 | .............. | H02G 3/22 |
| DE | 102012001409 A1 * | 7/2013 | .............. | H02G 3/32 |
| DE | 102012007416 A1 * | 10/2013 | ............. | F03D 80/85 |
| DE | 10 2012 017 463 | 3/2014 | | |
| DE | 102012017463 A1 * | 3/2014 | ............... | F16L 3/22 |
| DE | 10 2012 019 490 | 4/2014 | | |
| DE | 10 2012 013 465 | 5/2014 | | |
| DE | 10 2013 010 821 | 12/2014 | | |
| DE | 102014116468 A1 * | 5/2016 | .............. | H02G 3/32 |
| EP | 2927487 A1 * | 10/2015 | .............. | H02G 3/32 |
| JP | 7-183670 | 7/1995 | | |

\* cited by examiner

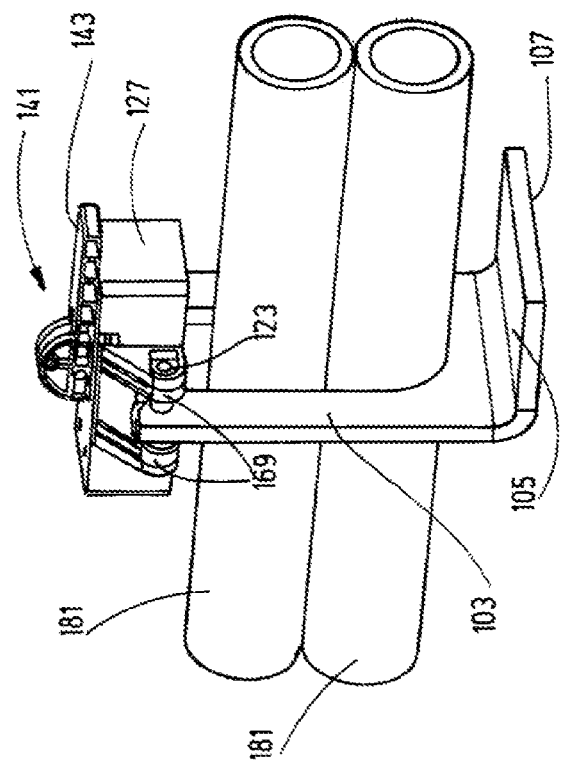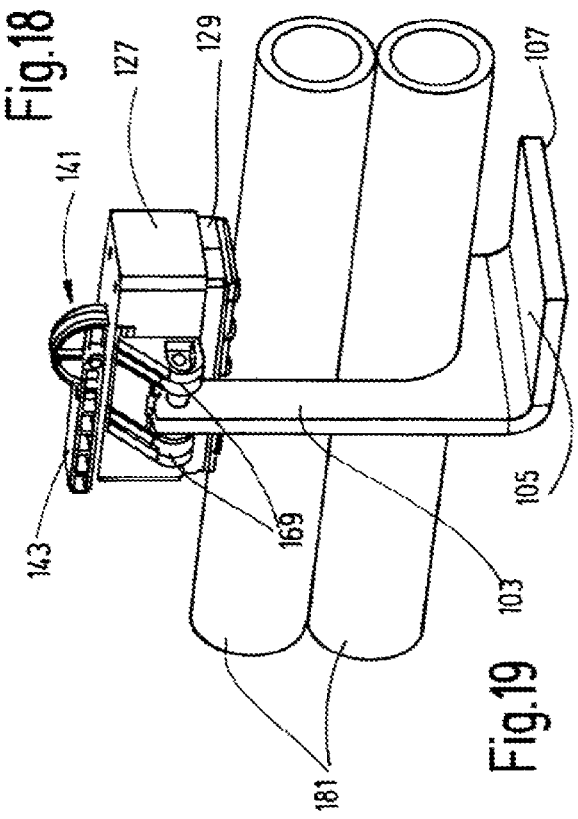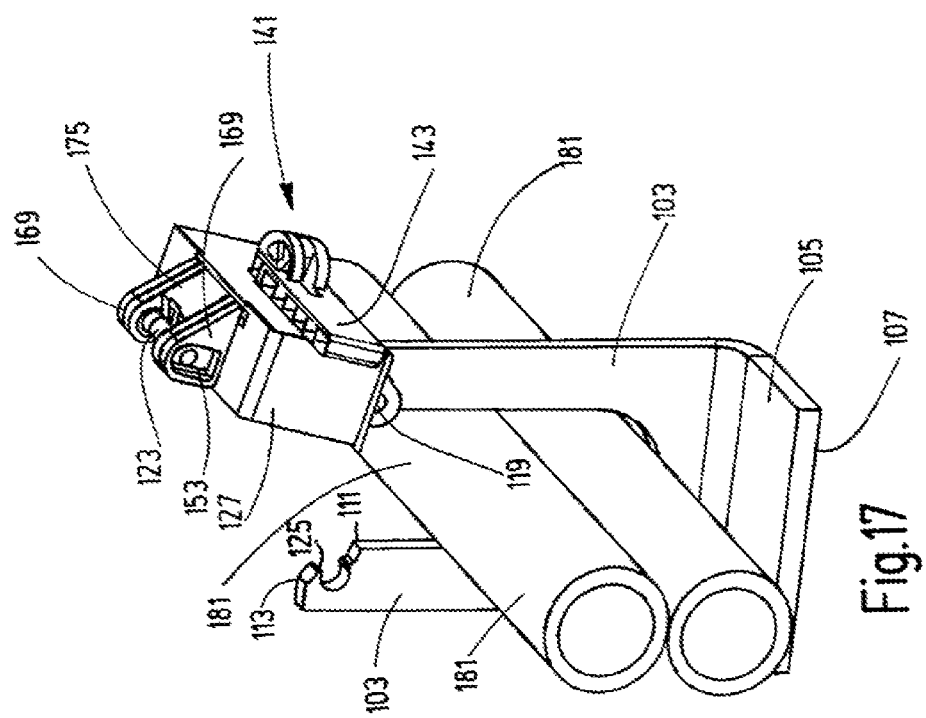

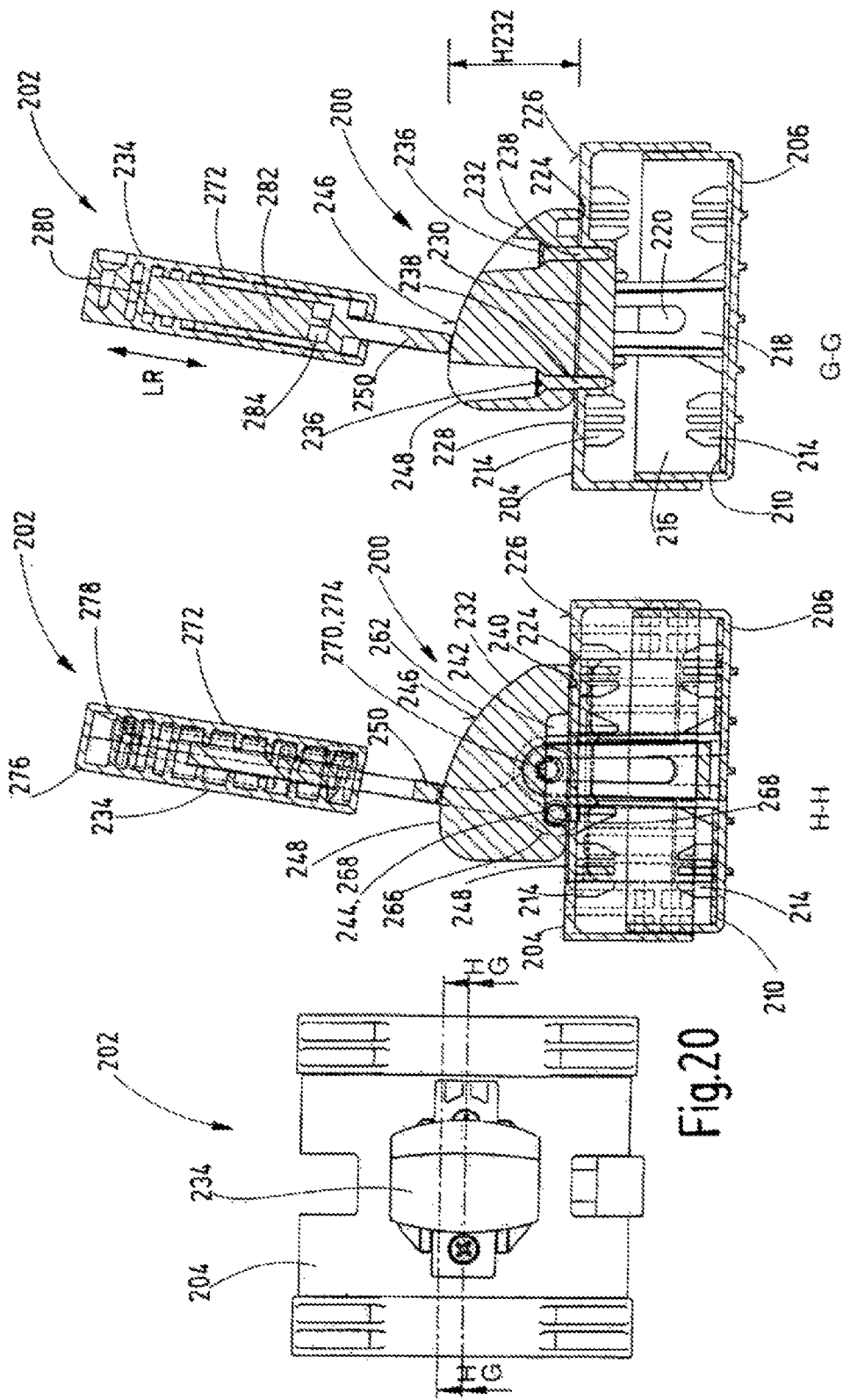

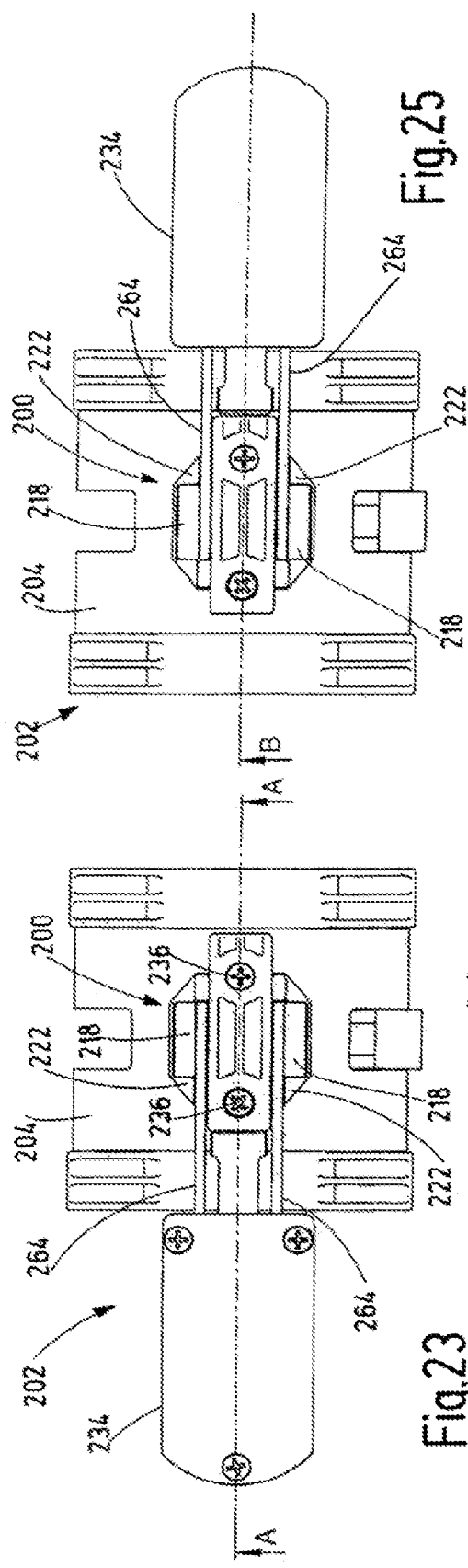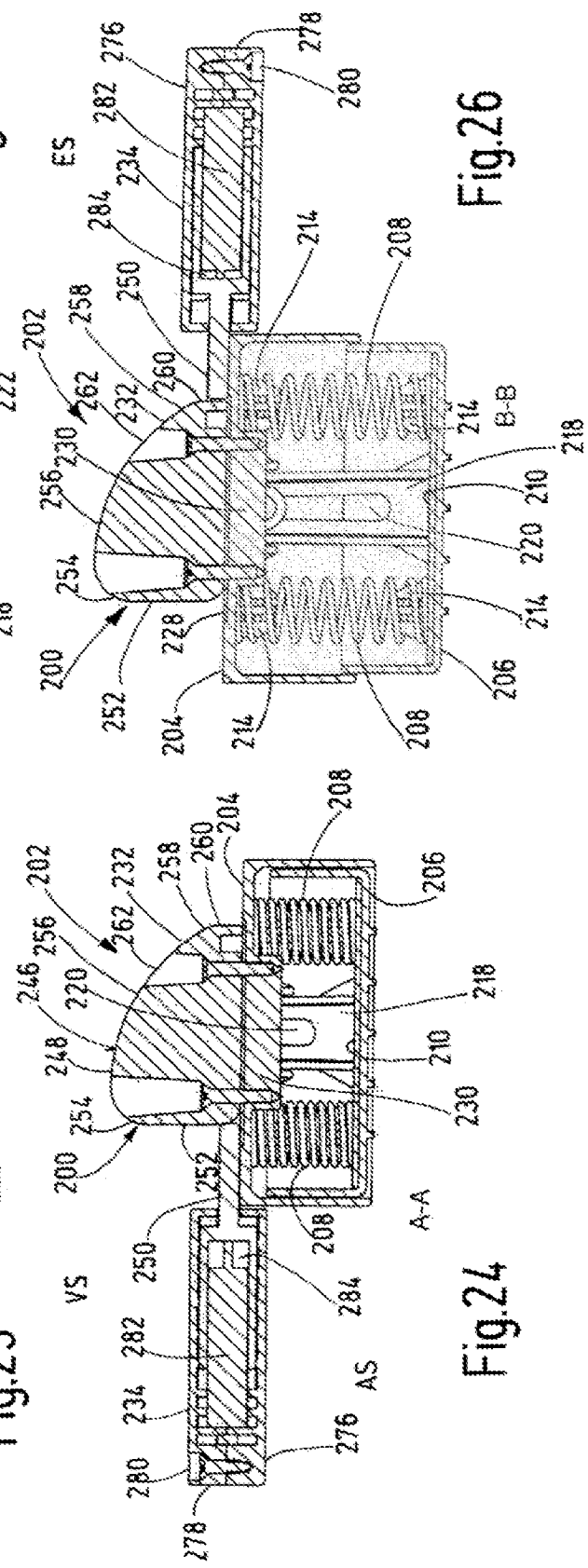

DEVICE FOR FASTENING AND/OR GUIDING STRAND-SHAPED ELEMENTS

FIELD OF THE INVENTION

The invention relates to a device for fastening and/or guiding strand-shaped elements, in particular of cables or cable bundles in wind turbines, having at least one retaining body, which can be combined with a carrier structure to form a modular fastening system, and which has a strand-receiving space as a bearing for at least one strand element. The strand element can be inserted in the receiving space through an opening located on the outside thereof. The opening can be closed by a covering device, which has a pressure part, which can be moved into a tensioning position where an energy storage exerts a retaining force on strand elements located in the strand-receiving space within a tensioning range.

BACKGROUND OF THE INVENTION

To conduct the energy generated in wind turbines, as well as for other operational purposes such as control, monitoring and the like, strand elements, such as power transmission cables, hoses, pipes and/or conduits for control or for communication purposes extending between the nacelle and the tower, have to be reliably attached to corresponding carrier structures, especially on the tower segments. Devices of the type mentioned are disclosed by way of example in the relevant prior art including DE10 2010 032 686 A1 and DE 10 2012 017 463 A1. For doing so, the retaining bodies can be arranged adjoining one another in a straight-line sequential arrangement, as is the case with the solution known from DE 10 2010 032 686 A1, or can be arranged successively in one along a partial arc or a circular arc, wherein the openings of the retaining bodies forming the bearing of the strand elements are located radially on the outside. In the known devices, the pressure parts of the closures provided for closing the openings of the retaining bodies are loaded by a spring pack to exert a retaining force on the strand elements located in the bearing. To ensure a secure fixation of the strand elements, retaining forces of about 200 N to 400 N are required for use in wind turbines, where the heavy cable weights must be manageable. In the process of closing the openings of the retaining bodies correspondingly high closing forces have to be overcome, resulting in the actuation of the known devices being relatively cumbersome and accordingly time-consuming for the operator.

SUMMARY OF THE INVENTION

Based on this prior art, the invention addresses the problem of providing an improved device of the type mentioned, which is particularly simple and easy to actuate.

This problem is basically solved by a device of the type mentioned, at the start in that the cover device, having a locking device or lock by which the pressure part can optionally be secured against a motion into the tensioning position counter the action of the energy storage or released for a tensioning motion. If the pressure part is locked such that the energy storage is rendered ineffective, the opening of the respective retaining body can be closed by the cover device without much effort. The device according to the invention is then simple and easy to actuate with little expenditure of time.

Advantageously, the pressure part is pre-tensioned by at least one compression spring serving as the energy storage for the motion relative to the motion in the tensioning position. The compression spring is supported on a main part of the cover device mountable on the retaining body. In this case, a spring pack of a plurality of compression springs may be provided with a rectangular main part. Preferably, the main part is supported on each of its four corner areas.

In particularly advantageous exemplary embodiments, the retaining body has two sidewalls spaced apart in the axial direction of the tensioning elements. The sidewalls form the contact surfaces for strand elements in one trough-shaped recess each and extend from the opening at the outside. The design of the contact surfaces formed in the trough-shaped recesses may be adapted to the relevant different types, shapes and sizes of strand elements or bundles.

In particularly advantageous exemplary embodiments, the retaining body has a frame shaped like a U-section. The retaining body sidewalls are formed by mutually parallel section legs, which are interconnected by an attachment surface for the connection to the web forming the carrier structure. In this case, the U-section may be a bent piece of sheet metal. The section legs forming the bearing sidewalls may be extended to form a section strip, which forms a corresponding number of retaining bodies in sequential arrangement.

With particular advantage, the arrangement can be made in such a manner that the width of the recesses of the retaining body sidewalls, starting from the contact surfaces at the bottom of the recesses towards the opening, is extended in stages. The lower stages form guiding surfaces for the tensioning motion of the pressure part. The adjacent stages in the direction of the opening form seating surfaces for the cover device mounted on the bearing. The recesses of the bearing sidewalls then form both a seat for the cover device closing the opening and the guide for the movable pressure part.

In advantageous exemplary embodiments, the main part of the covering device has a shell part open towards the pressure part. The shell part, in a position mounted at the retaining body extends in the axial direction of the strand elements from sidewall to sidewall and forms guideways extending between these sides. Necks of the pressure part are guided for its motions relative to the main part. Advantageously, the necks can form functional elements of the locking device using an end portion projecting over the main part, i.e. the operative connection between the pressure part and locking device. The compression springs can be arranged in the interior of the shell part.

The locking device may particularly advantageously have a manually rotatable eccentric, which is supported on the top face of the main part. The eccentric shaft forming the eccentric axle executes a lifting motion relative to the main part during rotation. The eccentric shaft engages with a slot in the necks of the pressure part in such a manner that in the locking position of the eccentric, the pressure part is pulled against the pre-tensioning spring action of the main part. In the release position of the eccentric, the pressure part is released for the tensioning motion. Due to the fact that the spring pack forming the energy storage can be tensioned by an eccentric, the locking device can be actuated by a small force required for rotating the eccentric.

Advantageously, the retaining body sidewalls have hook parts projecting against each other at the opening of the recesses. The hook parts adjoin depressions in the sidewalls. Retaining wings of the cover can be passed through the depressions in the process of attaching the cover with retaining wings being arranged laterally projecting on the main part and over which the hook parts engage in the attached position. The cover device can be securely fixated at the individual retaining body by the positive engagement over the hook parts.

The retaining wings may be provided at the ends of a cover plate of the main part, which supports the eccentric of the locking device. Such a cover plate may be formed, for example, as a sheet metal part, which may, for instance, be clipped to the existing shell-shaped main part made of plastic, and which may contribute to the structural strength of the entire main part. The metallic retaining wings ensure a secure fastening of the cover device at the opening of bearing.

The arrangement can furthermore advantageously be made such that on both ends of the sides of the main part having the guideways allocated to sides of the retaining body sidewalls, yieldingly protruding locking lugs are provided. These locking lugs engage with the inner sides of the bearing sidewalls if the position of the cover device is oriented towards the retaining body. The attachment of the cover at the opening of the individual retaining body is characterized by being particularly simple and easy, because the engagement of the locking lug signals the reaching of the alignment position of the cover device upon the lateral insertion of the retaining wings into the indentations or depressions under the hook parts of the bearing sidewalls.

The locking device may particularly advantageously have a manually rotatable eccentric, which is supported on the top face of the main part. An associated crank pin forming the eccentric axle then executes a lifting motion relative to the main part during rotation. The crank pin is coupled to the pressure part via a connecting rod in such a manner that in the locking position of the eccentric the pressure part is pulled against the pre-tensioning spring action of the main part and in the release position of the eccentric it is released for the tensioning motion.

Due to the fact that the spring pack forming the energy accumulator can be tensioned by an eccentric, the locking device can be actuated by a small force required for rotating the eccentric.

In particularly advantageous exemplary embodiments, the eccentric has a cylinder part, which is manually rotatable by a hand lever cantilevered therefrom. The hand lever is supported on the top side of the main part, with the crank pin is located at a distance from the cylinder axis.

The arrangement can be made with particular advantage such that the cylinder part is formed by two circular disks spaced apart, between which the crank pin for the connecting rod engaging between the circular disks is arranged.

With particular advantage, in this case, a trough may be formed as a bearing of the cylinder part at the top side of the main part, with which the cylinder part engages through a recess which is recessed in a cover plate resting against the top side of the main part. The recess is delimited by opposing opening edges, which extend along the planes of the circular discs engaging with the recess. In this way, a defined position on the top side of the main part is specified for the eccentric. The cover plate and two opposing opening edges form a guide of the eccentric effective in the axial direction of the circular discs.

In particularly advantageous exemplary embodiments, the retaining body has a strand-receiving space in the form of a U- or V-shaped indentation having an insertion opening with opposing opening edges. At one of opening edge, the cover device is pivotally mounted such that it can be moved between an open position and a position closing the insertion opening. A bolt arrangement is provided on the cover device, which bolt arrangement can be used to releasably lock it to the other opening edge of the insertion opening in the closing position.

In advantageous exemplary embodiments, the retaining body is formed by a bent sheet metal part having a first flat plate part, which has the indentation of the strand-receiving space, and a second plate part angled therefrom, which forms a mounting surface opposite the insertion opening for connection to a relevant carrier structure. If it is desired to arrange a plurality of retaining bodies in a straight sequential arrangement next to one another, as is the case with the device known from DE 10 2010 032 686 A1, the bent sheet metal part can be extended to form an angle section rail. The indentations forming the strand-receiving spaces lying side by side are then recessed in section legs forming the first plate part.

In particularly advantageous embodiments, the arrangement may be such that the main part of the cover device for the connection to every opening edge of the individual insertion opening of the first plate part has a pair of arms each. The cantilever in the opposite direction from the main part, between which arms an interstice permitting an engagement of the plate part is formed.

With particular advantage, in this case the arms of the arm pair allocated to the bolt assembly may have a slot each. A locking bolt can be moved in each slot between a bolt position, in which it is locked by a latch hook on the opening edge, and a retracted unlocking position. An actuating spring pre-tensioning the locking bolt in the locking position is present, which spring can be manually moved into a position retracting the locking bolt to release the bolt assembly.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 17 is a perspective view of the retaining body of the second exemplary embodiment having inserted strand elements, wherein the cover device having a locked pressure part is pivoted to the open position;

FIGS. 18 and 19 are perspective views of the retaining body of the second exemplary embodiment, each having a cover device located in the closed position, wherein the pressure part is locked and released, respectively;

FIGS. 20 up to 26 are top views and side views in section of a locking device according to a third exemplary embodiment of the invention.

DETAILED DESCRIPTION OF THE INVENTION

Figure 1:
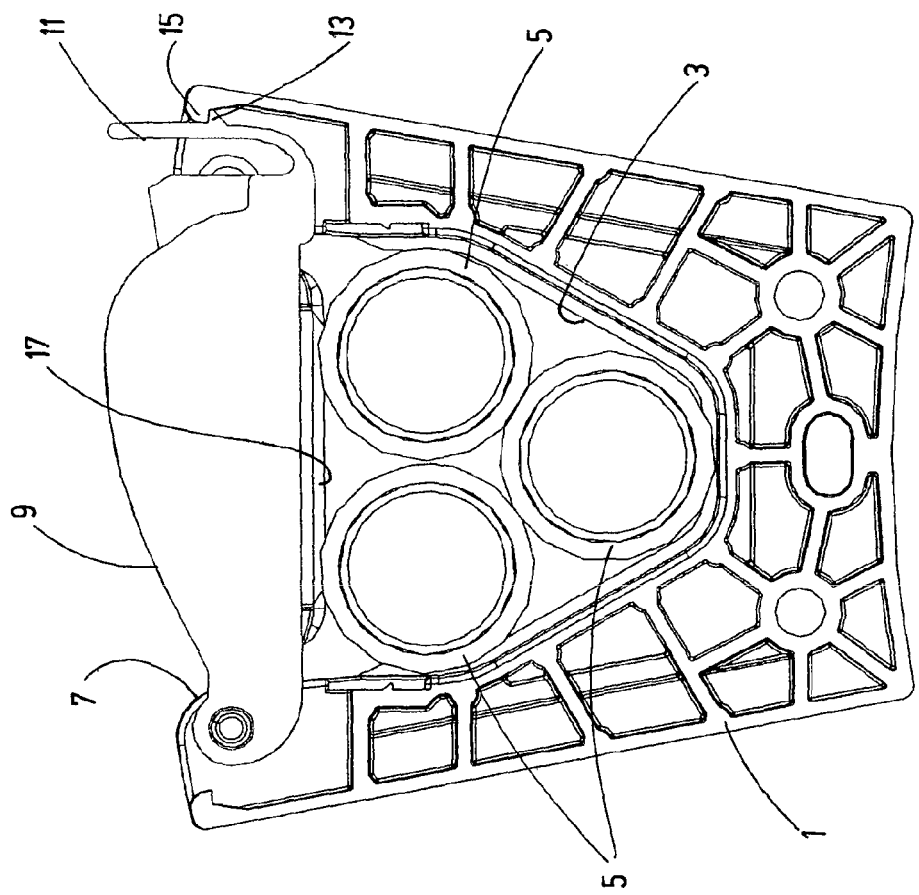
FIGS. 1 and 2 are side views of a single retaining body of a prior art device for fastening and/or guiding the strand elements, showing the open state and closed state of the retaining body, respectively.
Figure 2:
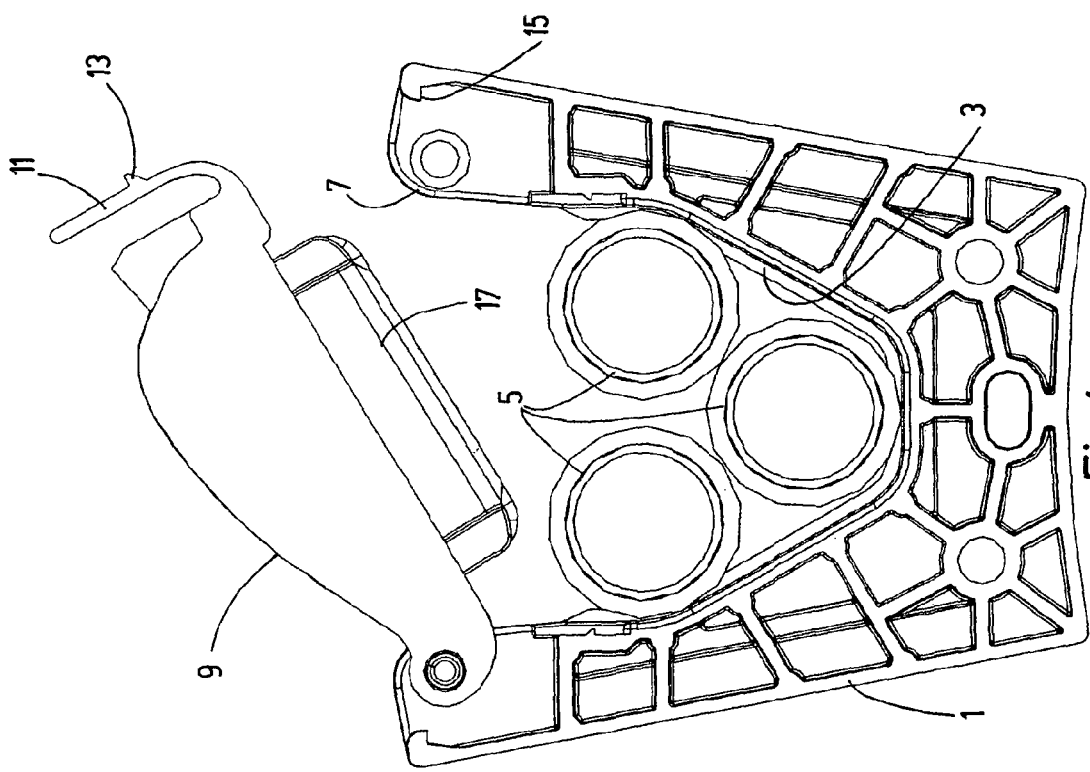
Figure 3:
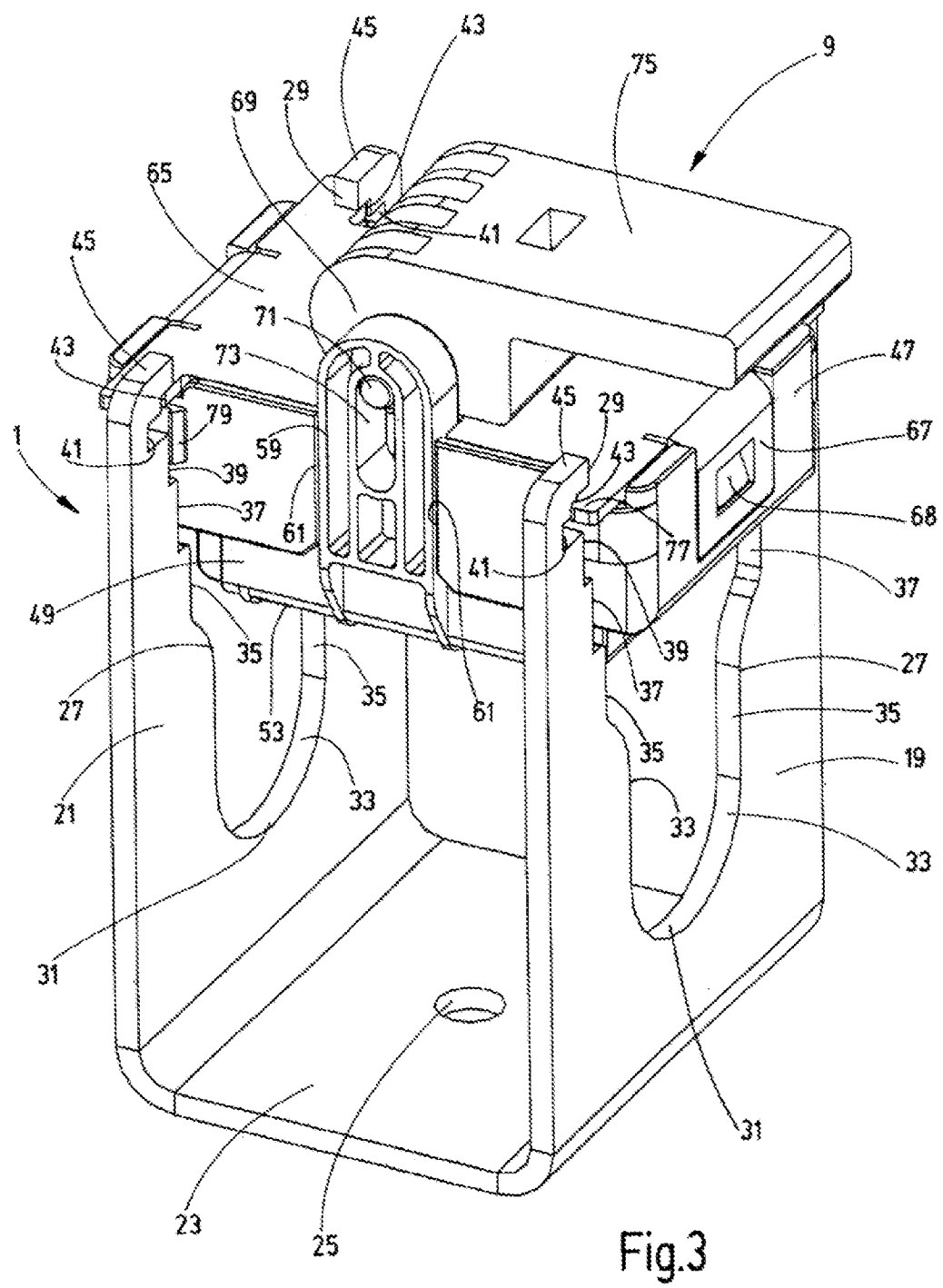
FIG. 3 is a perspective view of a single retaining body according to a first exemplary embodiment of the invention, without strand elements inserted into the retaining body and for an unlocked pressure part of the cover device.

FIGS. 1 and 2 show a retaining body 1 of a prior art device for fastening and/or guiding cables or cable bundles depicted individually, without the associated carrier structure. The retaining body 1 has a trough-shaped indentation 3 as bearing and bushing for strand elements, which indentation tapers at the bottom similar to a V-shape. A bundle of three cables inserted from an upper opening 7 are located in the indentation 3. FIG. 1 shows the opened state of the retaining body 1, wherein a cover device 9 is pivoted in a position releasing the opening 7. FIG. 2 shows the closed state in which the cover device 9 closes the opening 7 and is secured by hooking a projection 13 located on a latching tongue 11 to a latching hook 15, which is located at the upper edge of the retaining body. Corresponding to the cited prior art, the cover device 9 has a pressure part 17 for applying a retaining force on inserted cables. The pressure part is pre-tensioned for a tensioning motion relative to the main part of the cover device 9 according to the prior art, using a spring pack located inside the cover device 9, not visible in FIGS. 1 and 2. FIG. 1 shows the position of the pressure part 7 fully extended over the available tensioning range, while FIG. 2 shows the tensioned position of the pressure part 17 transmitting or applying the retaining force.

Figure 10:
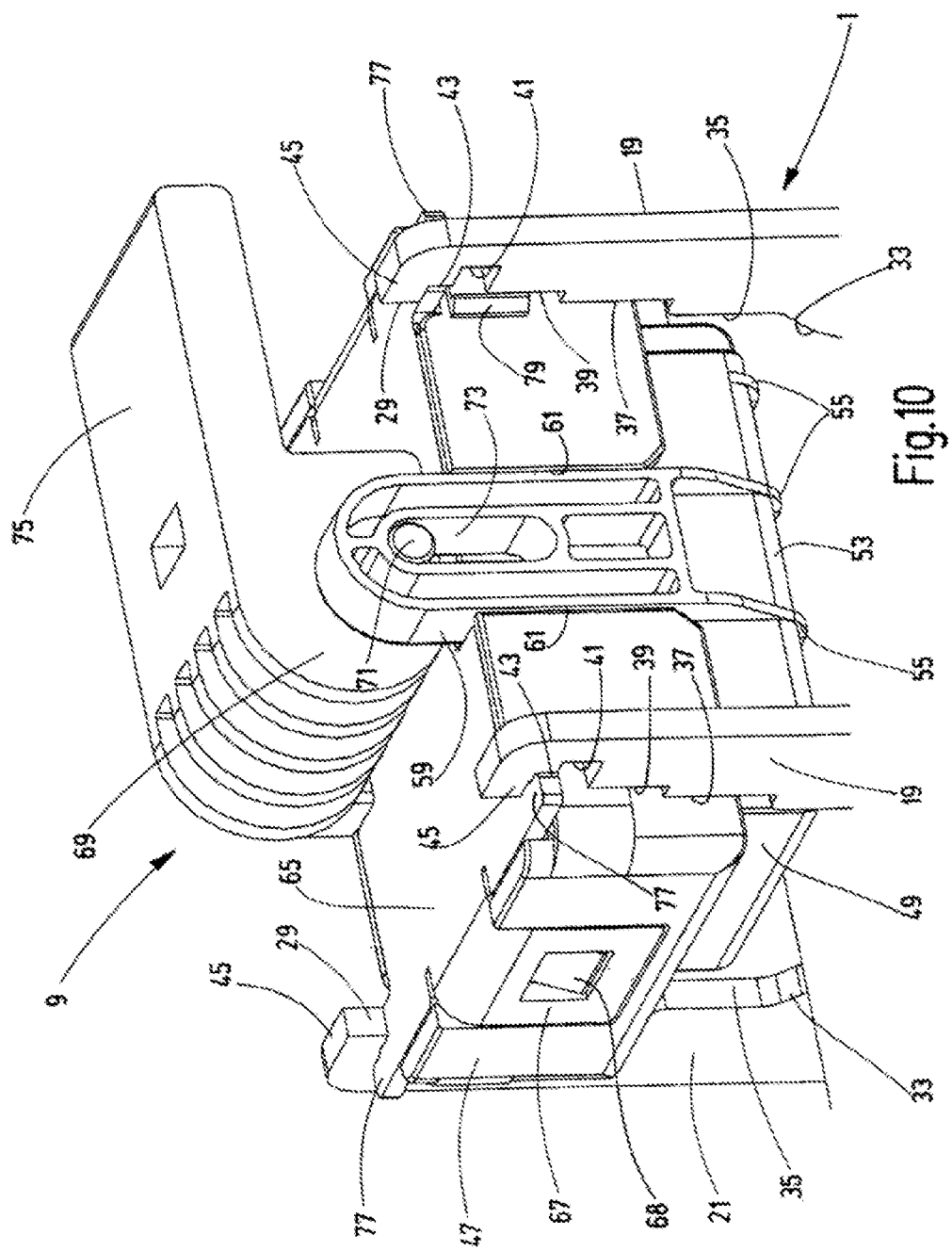
FIG. 10 is a partial perspective view of the opening portion, slightly enlarged in comparison to FIGS. 8 and 9, of the closed state of the covering device with an unlocked pressure part according to the first exemplary embodiment.

In the device according to the first exemplary embodiment of the invention in FIGS. 3-11, the respective retaining bodies 1 are formed by a frame that has a bent part made of sheet metal having the form of a U-section or U-shaped body. It has retaining body or bearing sidewalls 19 and 21 as a bearing for strand elements, which sidewalls are formed by mutually parallel, planar section legs of the U-section and are connected by a planar section web 23 perpendicular to the bearing sidewalls 19, 21. Web 23 serves as an attachment surface for the connection of the individual retaining body 1 to the (not shown) carrier structure, for instance by mounting holes 25 in the web 23. For the formation of contact surfaces for inserted strand elements 20, each bearing in the bearing sidewalls 19, 21 has a recess 27, which, starting from an opening 29 located at the free end of the bearing sidewalls 19, 21, has the shape of a trough. The width of each recess 27 tapers towards the trough bottom 31 in the manner of a V-shape. In the area adjoining the trough base 31, the edge of the indentation 27 forms contact surfaces 33 and 35 for inserted strand elements, of which two cables 5 are visible in FIGS. 7 to 9. Adjacent to the upper abutment surfaces 35, in the direction of the opening 29, the recesses 27 are widened in stages, wherein step surfaces 37 and 39 are formed parallel to each other and vertically extending in the direction of the section web 23. Adjacent to the upper step surfaces 39, the indentations 41 and 43 are formed in the recesses 27, as can be seen most clearly from FIG. 10, as further widening steps of the recesses 27. Adjacent to indentions 43, and delimiting the upper opening 29 of the recesses 27, hook parts 45 projecting against or toward each other are formed on the bearing sidewalls 19, 21, which hook parts, as shown in FIG. 10 and explained in more detail below, fixate the cover device 9 by positive engagement in the attached position on the retaining body 1.

Figure 4:
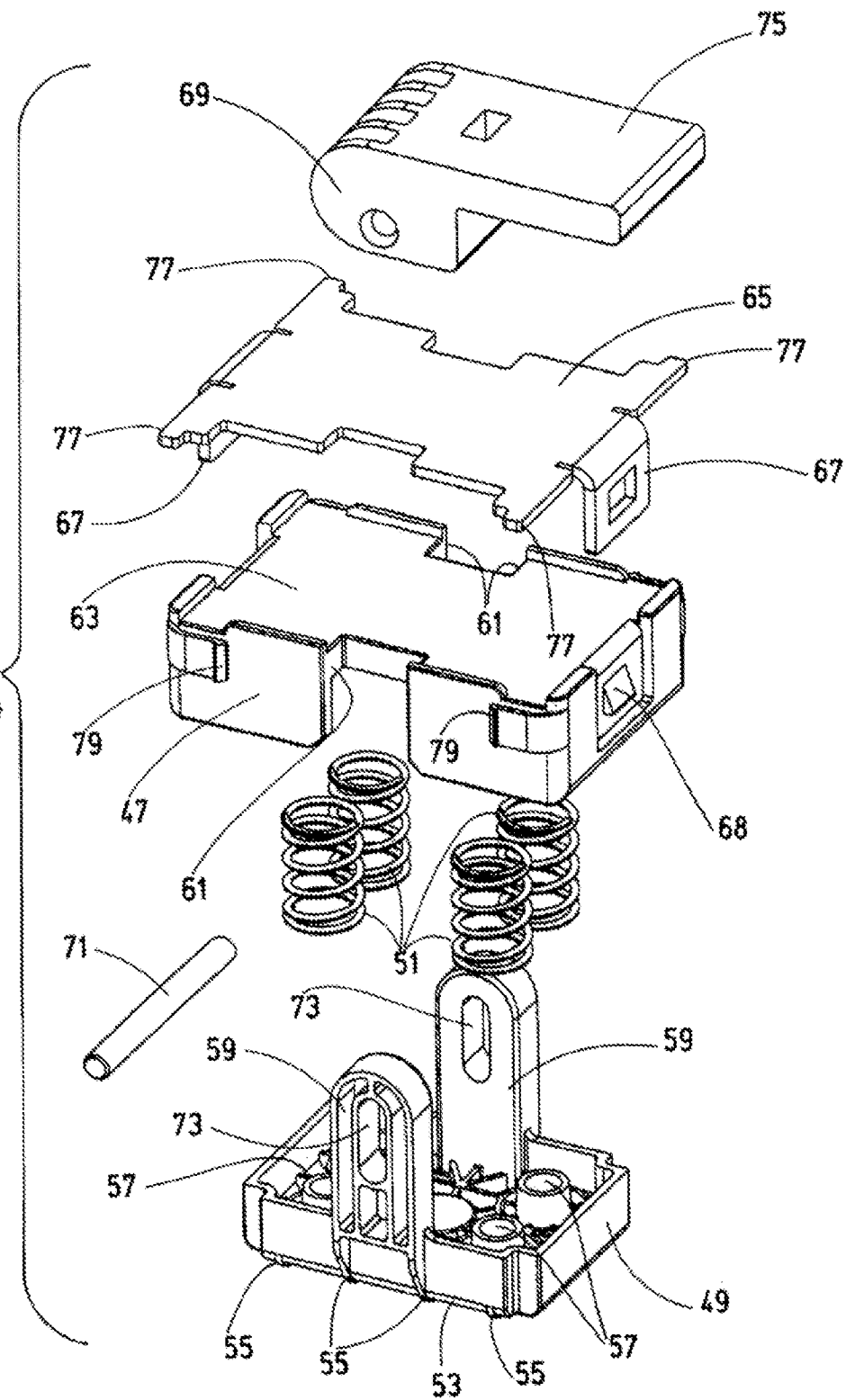
FIG. 4 is an exploded perspective view of the covering device of the first exemplary embodiment of the invention.
Figure 5:
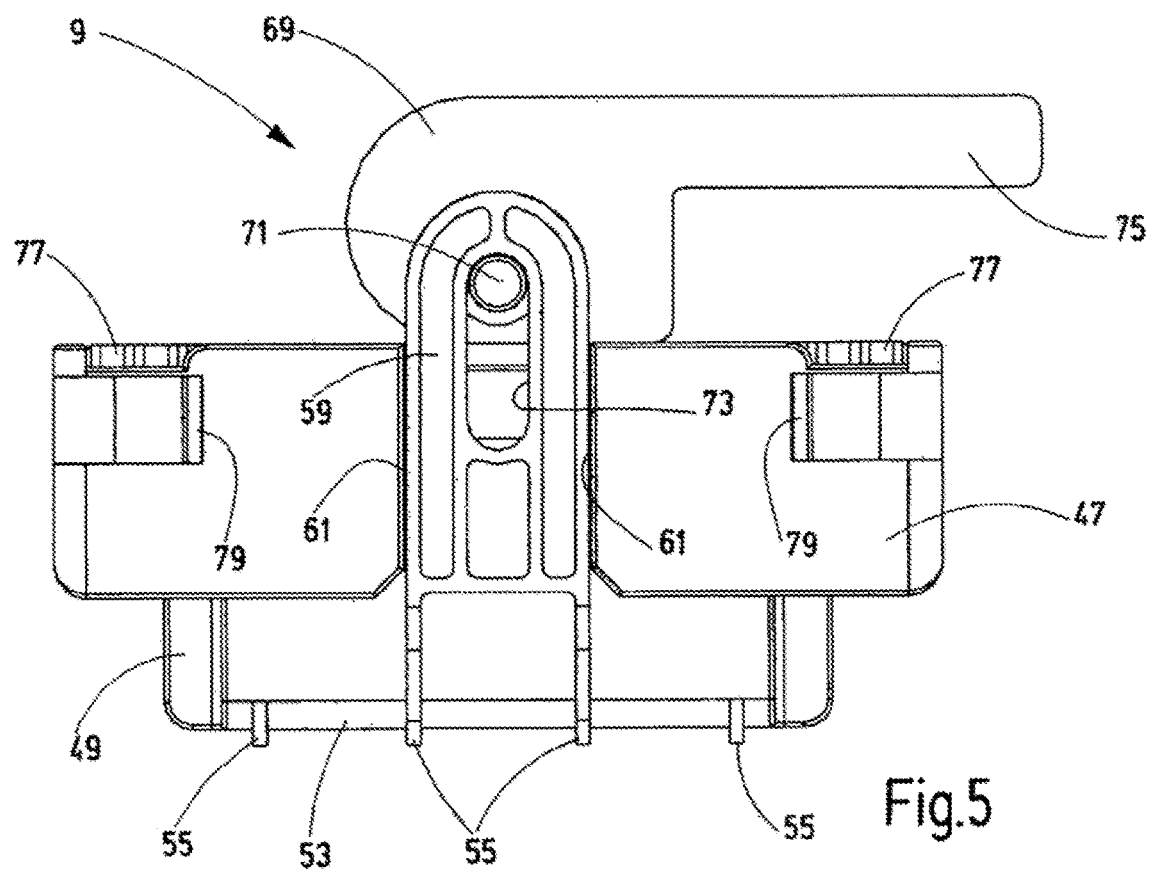
FIGS. 5 and 6 are side views of the cover device in the unlocked and the locked states of the pressure part, respectively.
Figure 6:
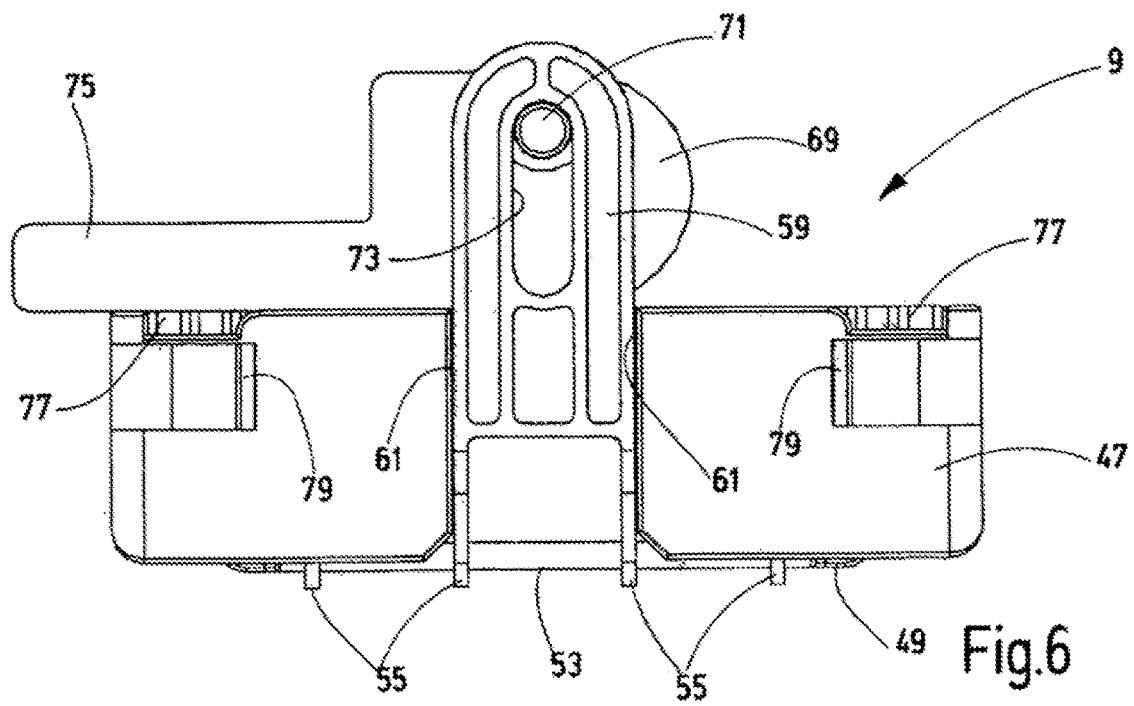

As can be seen most clearly in FIGS. 4 to 6, the cover device 9, the individual parts of which are shown in expanded exploded view in FIG. 4, has a main part 47 and a pressure part 49, which can be moved relative to the main part 47 for a lifting motion over a tensioning range. For this lifting motion, the pressure part 49 is pre-tensioned in the manner mentioned in the relevant prior art by a pack of four compression springs 51. FIG. 5 shows the pressure part 49 in the fully extended tensioning position, while in FIG. 6, the pressure part 49 is retracted against the action of the compression springs 51 and locked in this position. The main part 47 has the shape of a generally rectangular shell part, which is open towards the pressure part 49. The pressure part 49 also has a shell shape adapted to the main part 47, the outside of the shell bottom forming the pusher 53, whose projecting ribs 55 exert the retaining force on strand elements. The shell of the pressure part 49 is guided for lifting or tensioning motions along the inner shell walls of the main part 47 and forms, together with the shell of the main part 47, the spring housing for the four compression springs 51 located in the corner areas on pins 57 on pressure part 49. The main part 47 and the pressure part 49 are each integrally formed, for example by injection molding, and preferably made of a thermoplastic material.

The pressure part 49 has opposing necks 59 on its long sides, which extend perpendicularly away from the bottom 53 forming the pusher surface. The necks 59 form guiding bodies for the lifting and tensioning motions of the pressure part 49 and are also part of the locking device. For the guiding function, the necks 59 are guided in guideways 61, which are formed on the long sides of the main part 47. Main part 47 extends in the axial direction of the strand elements from bearing sidewall 19 to bearing sidewall 21 when mounted on the bearing of the retaining body 1. As functional parts of the locking device, the necks 59 extend beyond the top side 63 of the main part 47, on which a flat cover plate 65 made of sheet metal is located and is clipped onto the lugs 68 located on the front sides of the main part 47 using bent tabs 67.

Main parts of the locking device or lock are, in addition to the necks 59, an eccentric 69 having an eccentric shaft 71. The necks 59 each have a slot 73 for the eccentric shaft 71 of the eccentric 69, which is movable between the necks 59. Each slot 73 extends in the direction of the lifting motion of the pressure part 49 over a distance corresponding to the full lifting length or the tensioning range of the pressure part 49. While the spring pre-tension is applied, the eccentric shaft 71, the ends of which engage with the slots 73, abuts the upper end of the slots 73. If the eccentric 69, rotatable by a formed hand lever 75, supported on the cover plate 65, is rotated into the releasing or unlocking positions shown in FIGS. 3, 5 and 10, the eccentric shaft 71 is in the position close to the cover plate 65, into which the pressure part 49 can be extended by the action of the compression springs 51. In contrast to the locking position with lever 75 rotated or twisted by 180° in comparison, where the eccentric shaft 71 has the greatest distance from the cover plate 65, the pressure part 49 is retracted against the spring action, cf. in particular FIG. 6, and locked.

Figure 7:
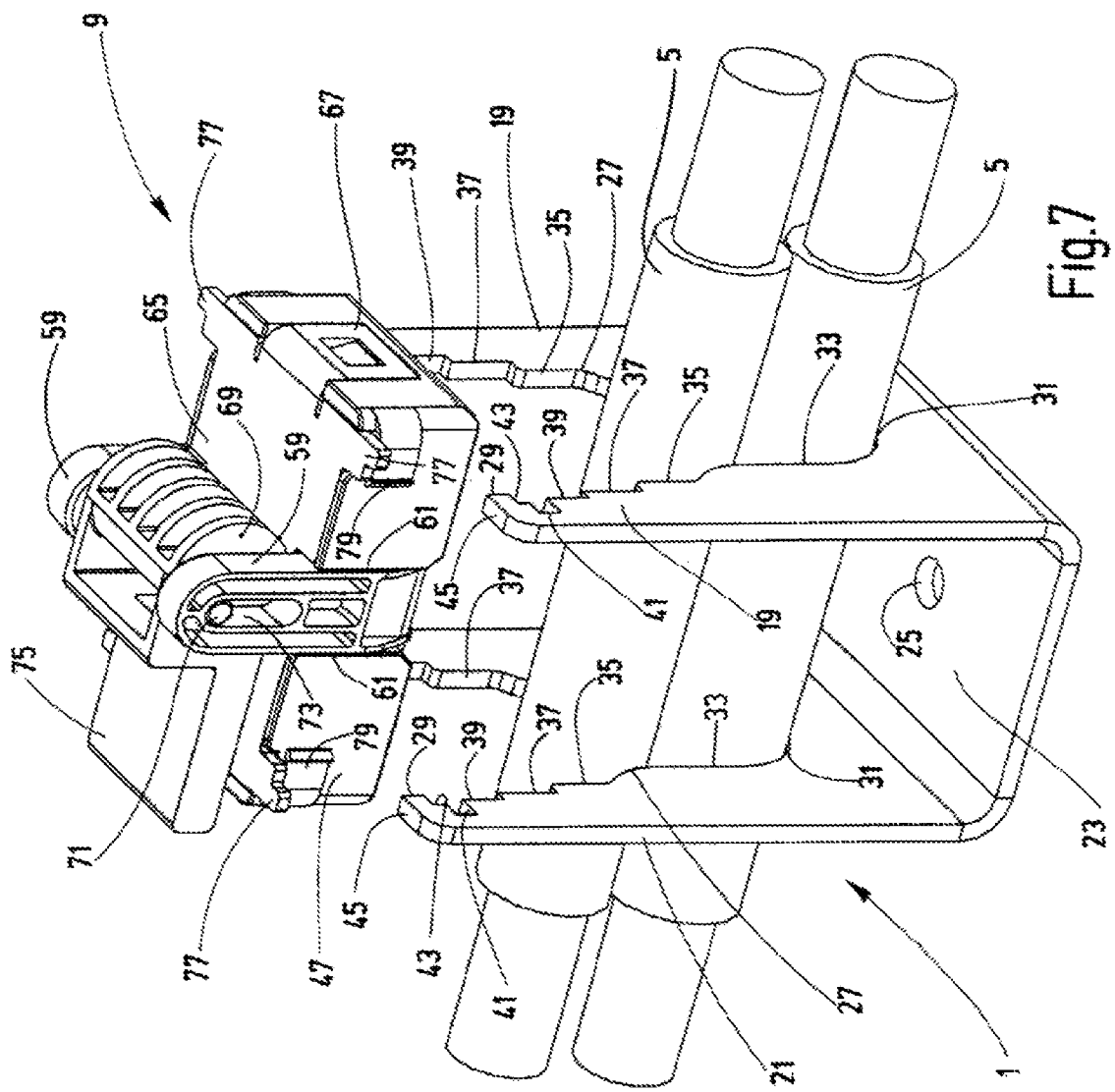
FIG. 7 is a perspective view of a single retaining body of the first exemplary embodiment having two inserted strand elements, the state shown being prior to attaching the cover device.

FIGS. 7 to 10 illustrate the mode of operation of the device according to the invention, wherein FIG. 7 shows the beginning of a mounting process of the cover device 9 for closing the opening 29 of the retaining body 1, in which two strand elements in the form of cables 5 are inserted. For the positive fastening of the cover device 9 on the bearing sidewalls 19, 21, the cover plate 65 of the cover device 9 has laterally projecting retaining wings 77 in the corner areas. To bring the cover device 9 into the final mounting position shown in FIGS. 9 and 10, in which the upper hook parts 45 positively engage over the cover plate 65 of the cover device 9, the cover device 9 is inserted, starting from the position shown in FIG. 7, in the axial direction of the cables 5, offset to the bearing sidewalls 19, 21, through the opening 29 between the bearing sidewalls 19, 21 until the wings 77 are aligned with the indentations 41 of the bearing sidewalls 19, 21.

Figure 8:
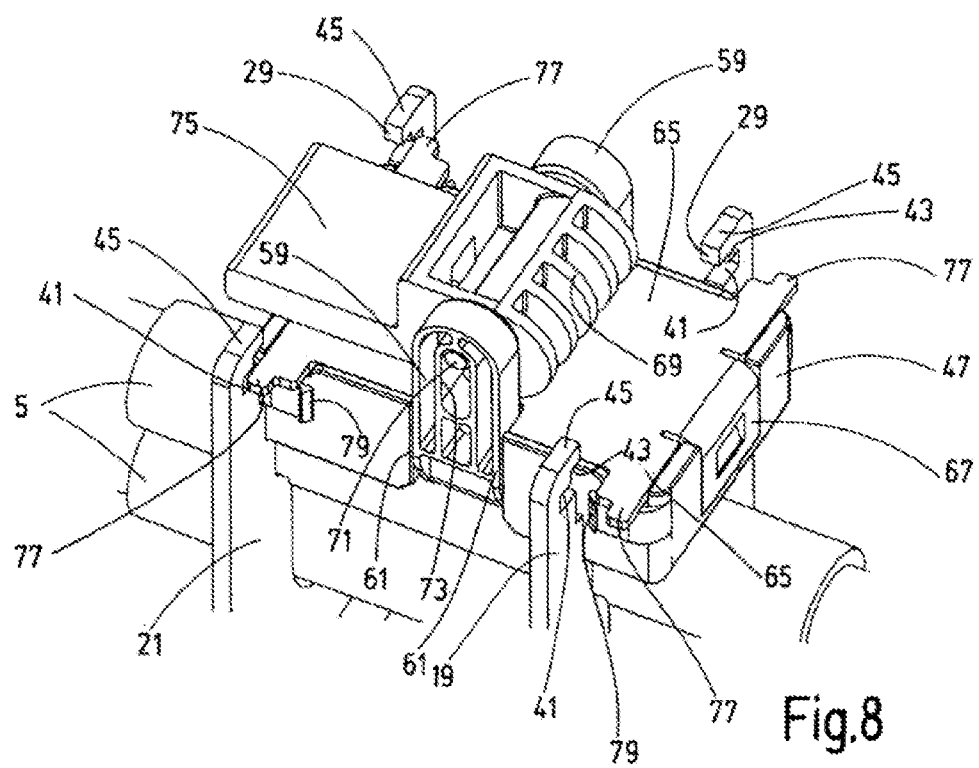
FIGS. 8 and 9 are partial, perspective views only of the opening portion of the retaining body of the first exemplary embodiment, wherein two steps in the attachment process of the cover device for a locked pressure part are respectively shown in succession.
Figure 9:
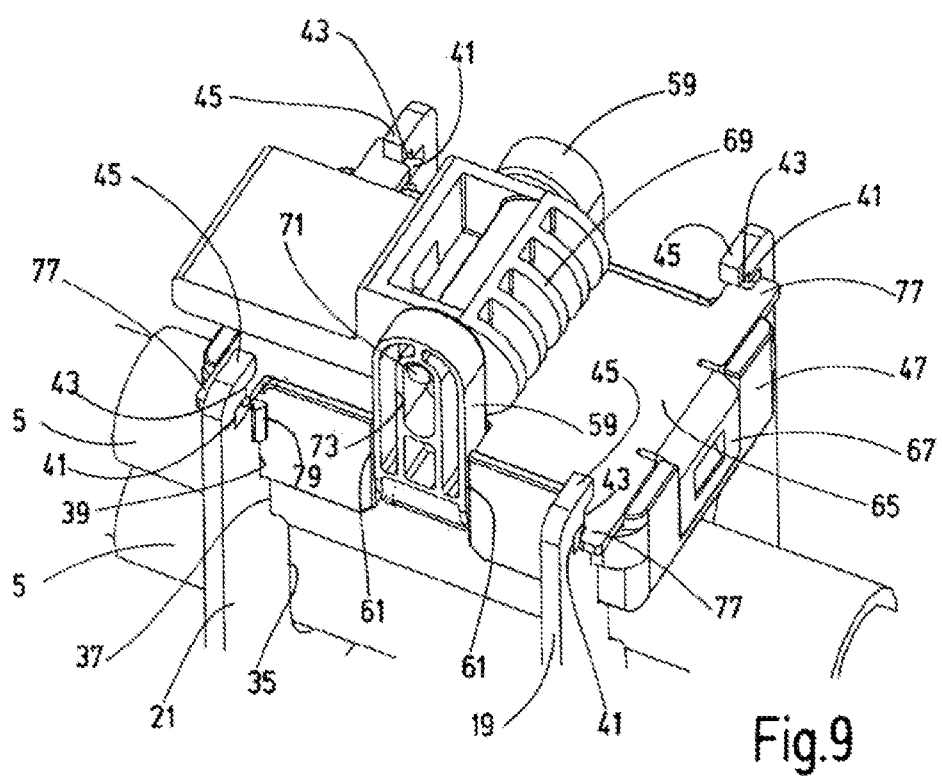

If the eccentric 69 is located in the locking position, this insertion is performed without effort with the pressure part 49 retracted into the position shown in FIG. 8. From there, the cover device 9 is axially displaced such that the wings 77 enter the indentation 41, cf. a comparison of FIGS. 8 and 9, until, upon reaching the aligned attachment position (FIG. 9), snap lugs 79, which yieldingly project on the sidewalls of the main part 47, latch into the insides of the bearing sidewalls 19, 21. If the eccentric 69 is rotated to the releasing or unlocking position in this alignment position, the pre-tension moves the pressure part 49 until it abuts the cables 5, resulting in the spring force acting between the cables and the main part 47 lifting the main part 47 into the attachment position shown in FIG. 10, in which the hook parts 45 positively engage over the wings 77. The wings 77 are, as can be most clearly seen in FIGS. 4, 7 and 8, stepped and their length is dimensioned such that the outer step can pass through the lower indentation 41 of the bearing sidewalls 19, 21, but not through the upper indentation 43. If the pressure part 49 is supported on inserted strand elements and thus the main part 47 is raised by the spring force, the most projecting step of the wings 77 therefore, projecting above the bottom of the indentations 43, abuts the outsides of the bearing sidewalls 19, 21 to axially secure the cover device 9.

To disassemble the cover device 9, the procedure is performed accordingly in that the pressure part 49 is locked, such that the cover device 9 is moved downwards without any effort to align the wings 77 on the indentations 41. As a result, the axial displacement can be performed until, after passage of the wings 77 through the indentations 41, the cover device 9 can be removed.

Figure 11:
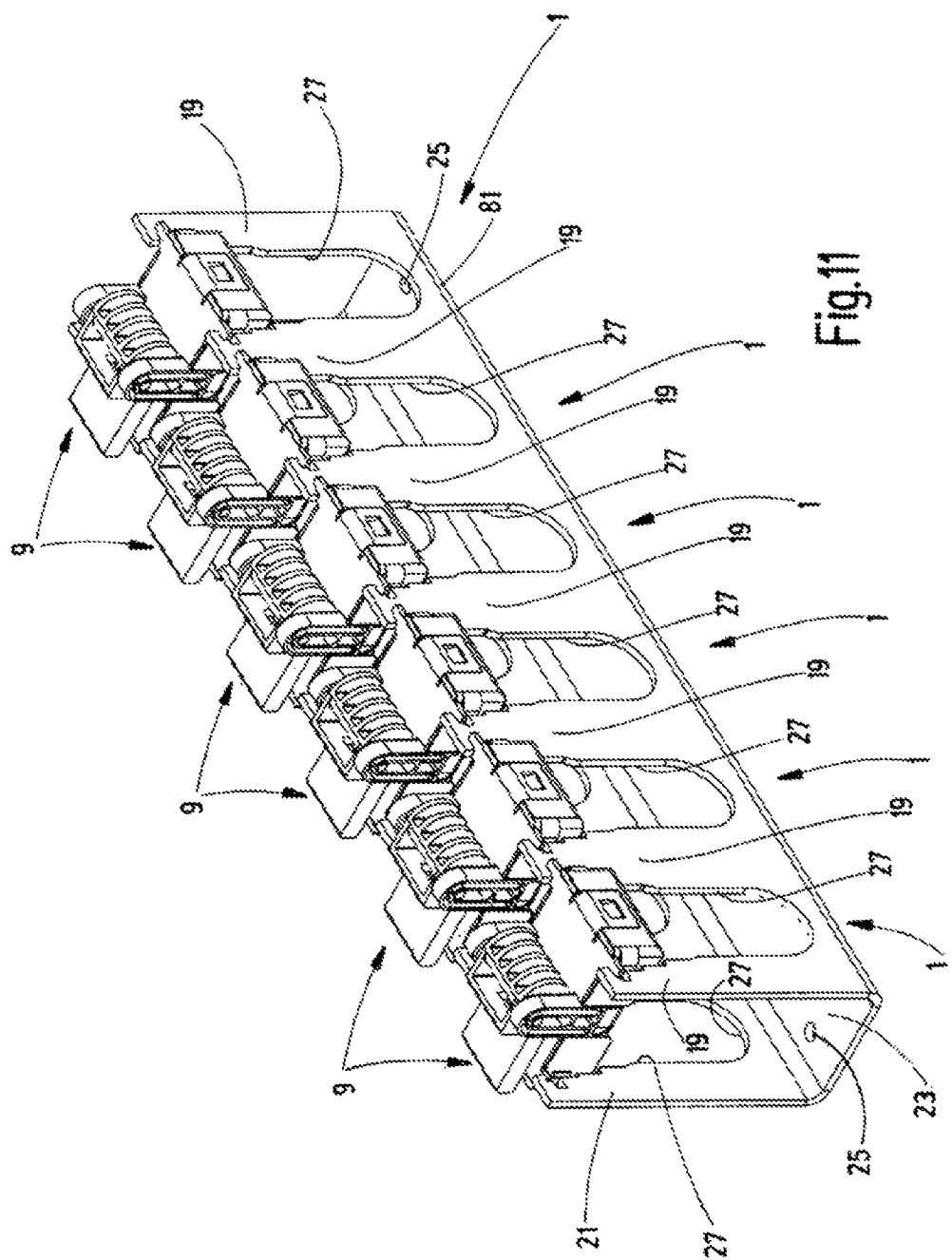
FIG. 11 is a perspective view of an exemplary embodiment of the device according to the invention, having a frame formed by a section strip and a plurality of retaining bodies laying side by side according to the first exemplary embodiment.

FIG. 11 shows an embodiment of the device according to the invention, in which the frame is formed by a U-section for a plurality of interconnected retaining bodies, in the example shown for six retaining bodies 1. The frame is extended into a section strip 81. As in the exemplary embodiment described above, the section legs connected by the section web 23 form the recesses 27 forming the bearing, which are uniformly shaped, as described above.

FIGS. 12 to 19 likewise show only one retaining body 101 of a further or second exemplary embodiment. For fastening and guiding a plurality of bundles of strand elements, such as cable bundles in wind turbines, a corresponding number of retaining bodies 101 may be provided and attached to the respective carrier structure, such as a tower segment. The retaining bodies 101 may be arranged next to each other in a straight sequential arrangement according to the type and shape of the attachment region on the carrier structure, or in an arcuate course. In the exemplary embodiment shown in FIGS. 12 to 19, the retaining bodies 101 are formed by a bent part bent made of a rectangular sheet steel plate such as to form a first plate part 103 from which a shorter second plate part 105 is bent at a right angle. The second plate part 105 forms a flat mounting surface 107 for the connection to the pertaining carrier structure, for example by screwing, using screw holes (not shown) in the second plate part 105. For strand elements to be inserted, the first plate part 103 forms a strand-receiving space in the form of a U-shaped indentation 109. Indentation 109 has an insertion opening 111 in the first plate part 103 adjacent its upper end, which insertion opening is delimited by the opening edges 113 and 115. For a plurality of rectilinear successive retaining bodies 101, the bent sheet metal part can be extended to form an angle section rail forming the number of retaining bodies, in which the indentations 109 in the section leg forming the first plate part 103 are successively formed.

Figure 12:
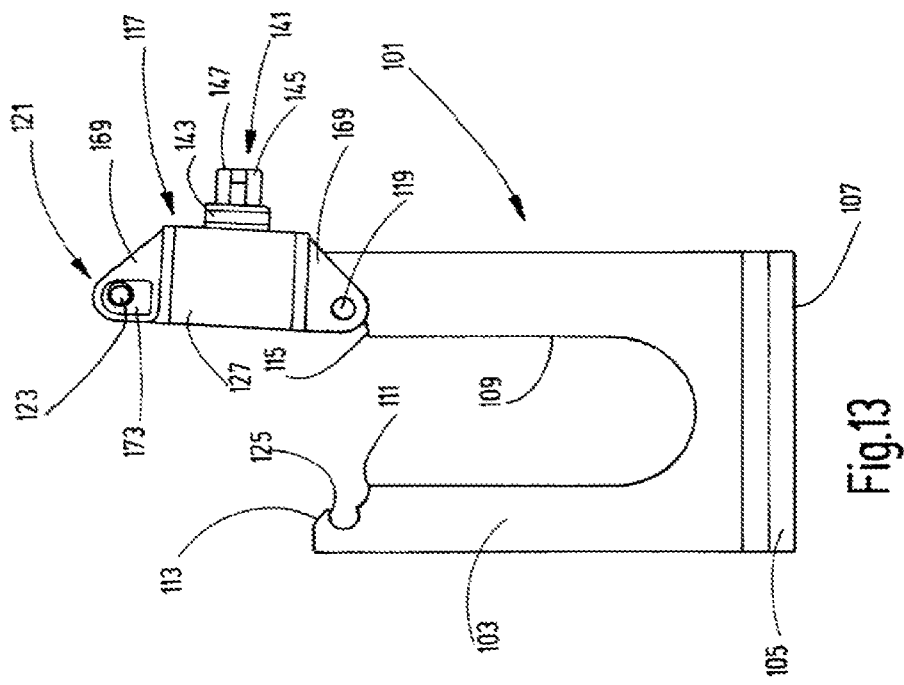
FIG. 12 is a perspective view of a single retaining body according to a second exemplary embodiment of the invention, shown without inserted strand elements and the cover device shown in the closed position with a locked pressure part.
Figure 13:
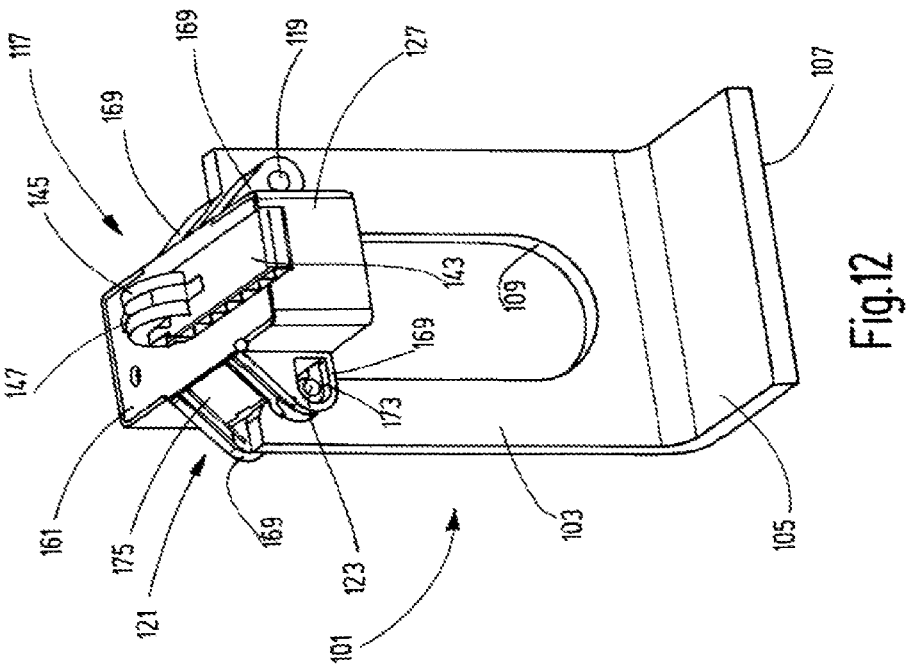
FIG. 13 is a front view of the retaining body according to the second exemplary embodiment, wherein the covering device having a locked pressure part pivoted to the open position.

FIGS. 12 and 13, in which the retaining body 101 is shown in each case without strand elements inserted into the indentation 109 forming the strand-receiving space, show the cover device 117 in a position closing the opening 111 of the indentation 109 (FIG. 12) or in an open position releasing the opening 111 (FIG. 13). In this case, a locking device allocated to the cover device 117 is in its individual locking position. The details of the cover device 117 and its locking device are shown in more detail in FIGS. 14 to 16. To achieve the transition between the open position and the closed position, the cover device is hinged to the opening edge 115 of the plate part 103 of the retaining body 101 for a pivoting motion by a pivot bearing 119. To form a releasable connection of the cover device 117 in the closed position with the other opening edge 113, a releasable latch assembly 121 is provided on the cover device 117, opposite of the pivot bearing 119. Latch assembly 121 has a locking bolt 123, the position of which can be adjusted for motion between a latch position, in which it positively engages with a latch hook 125 on the opening edge 113, and an unlocking position retracted therefrom.

Figure 14:
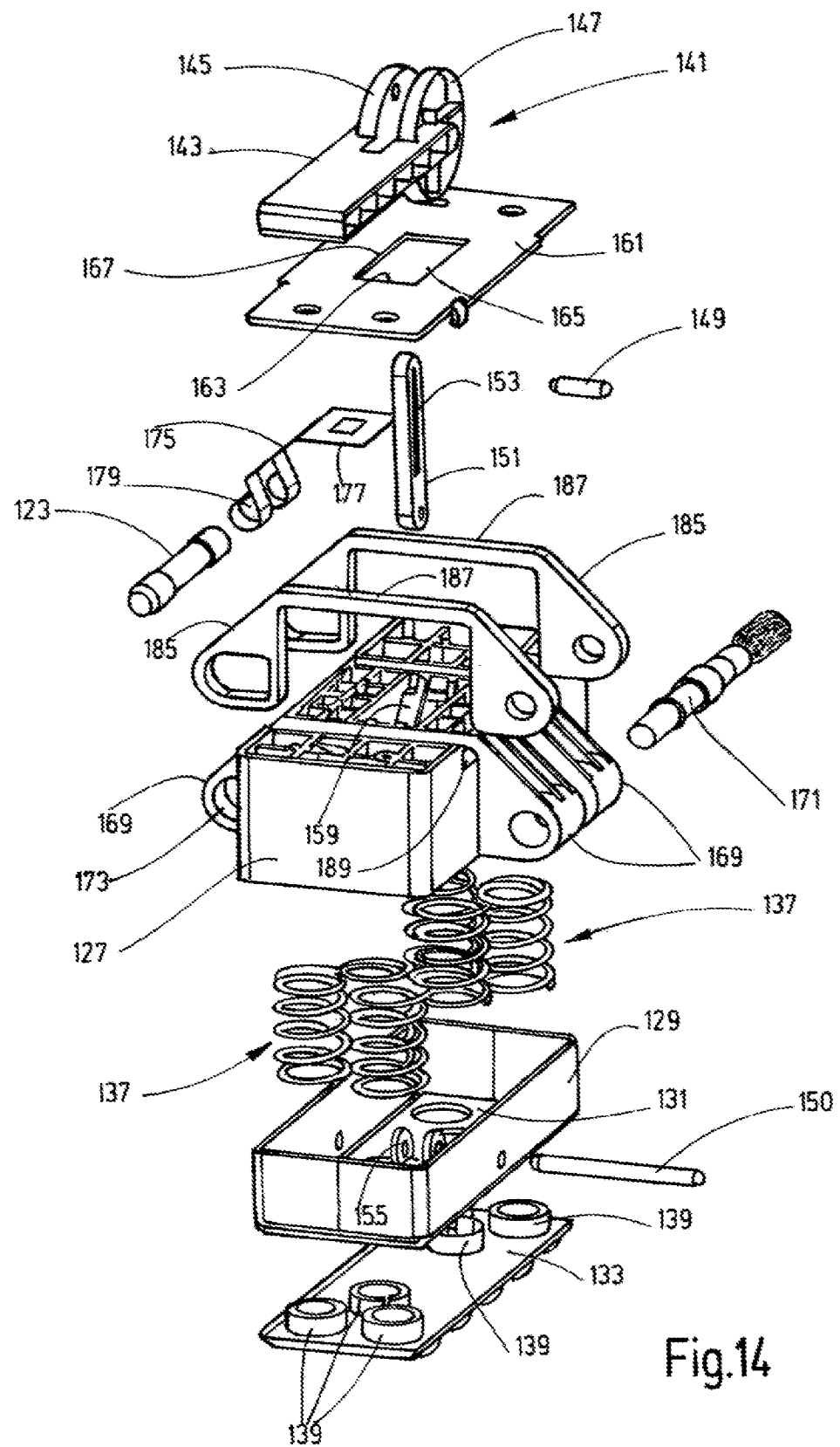
FIG. 14 is an exploded perspective view of the cover device of the second exemplary embodiment.
Figure 15:
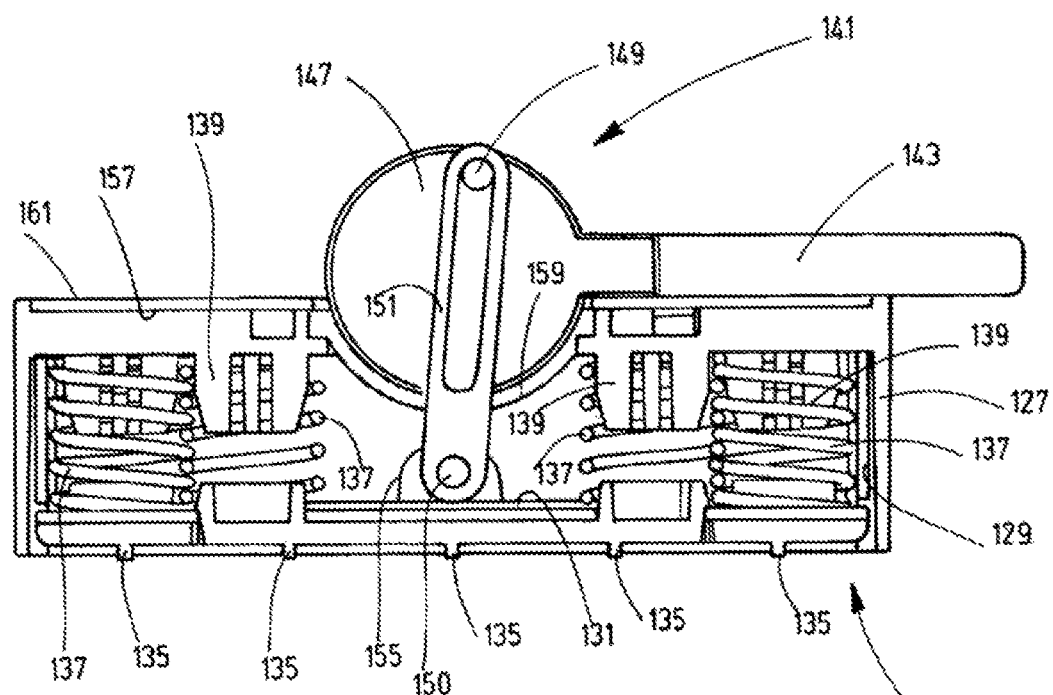
FIG. 15 is a side view in section of the cover device of the second exemplary embodiment having a pressure part in the locking position.
Figure 16:
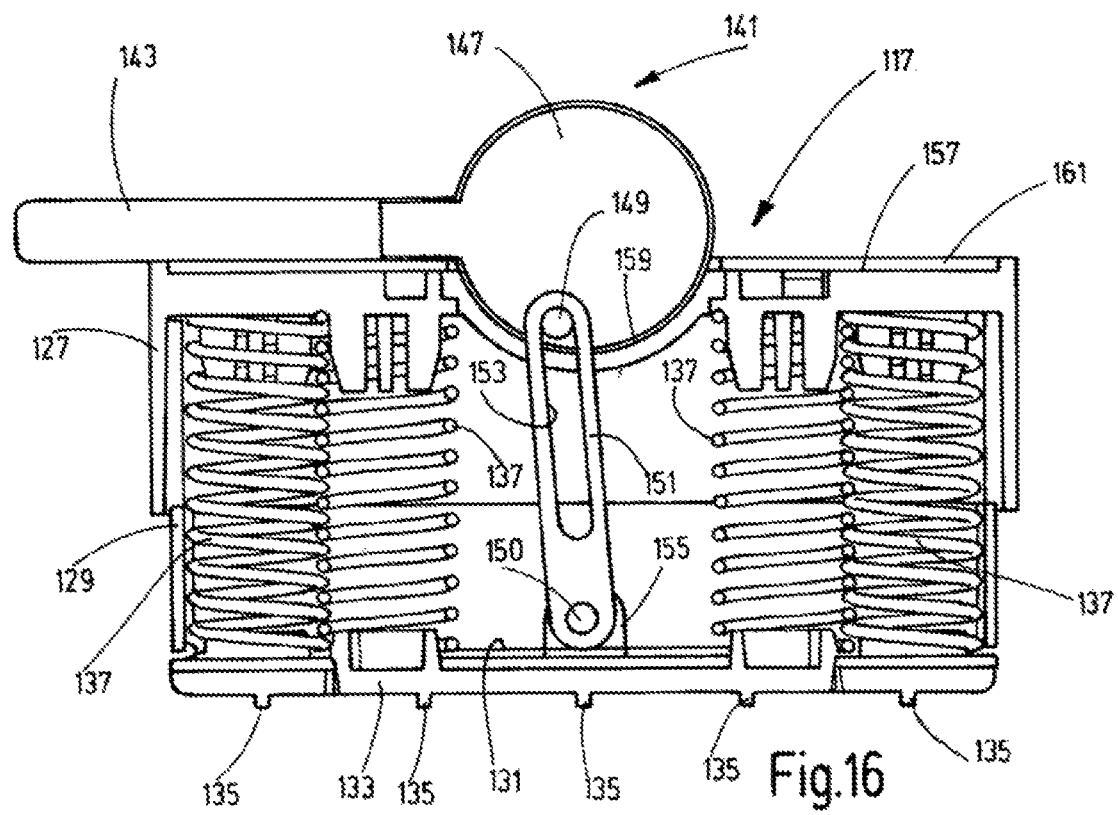
FIG. 16 is a side view in section of the cover device of the second exemplary embodiment, with an unlocked pressure part.
Figure 27:
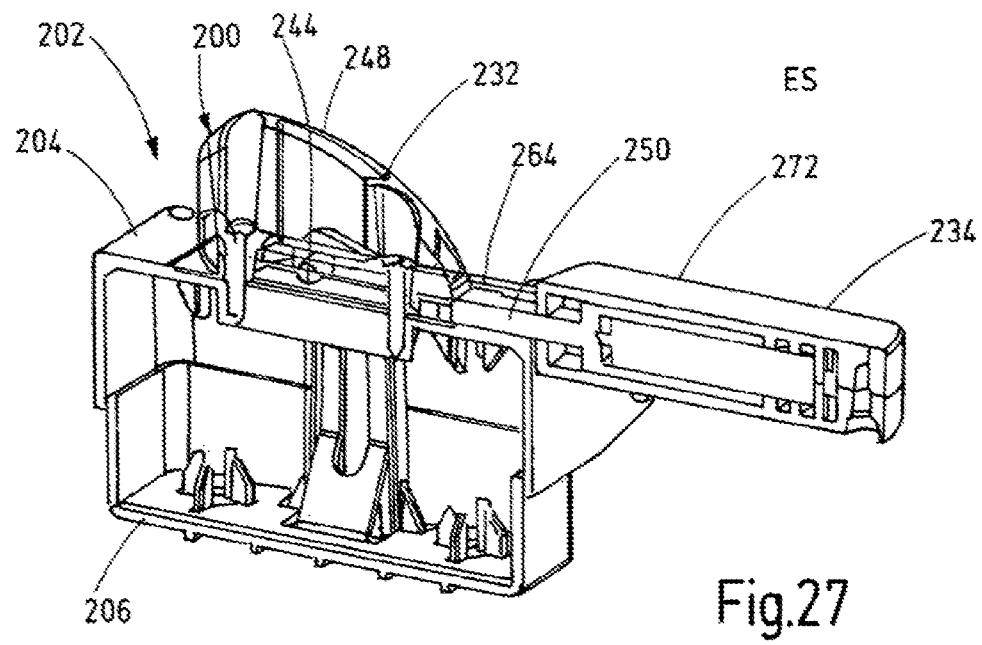
FIGS. 27 to 40 are perspective views of the locking device of FIGS. 20 to 26, which show the sequence of a motion from an unlocking position to a locking position.
Figure 28:
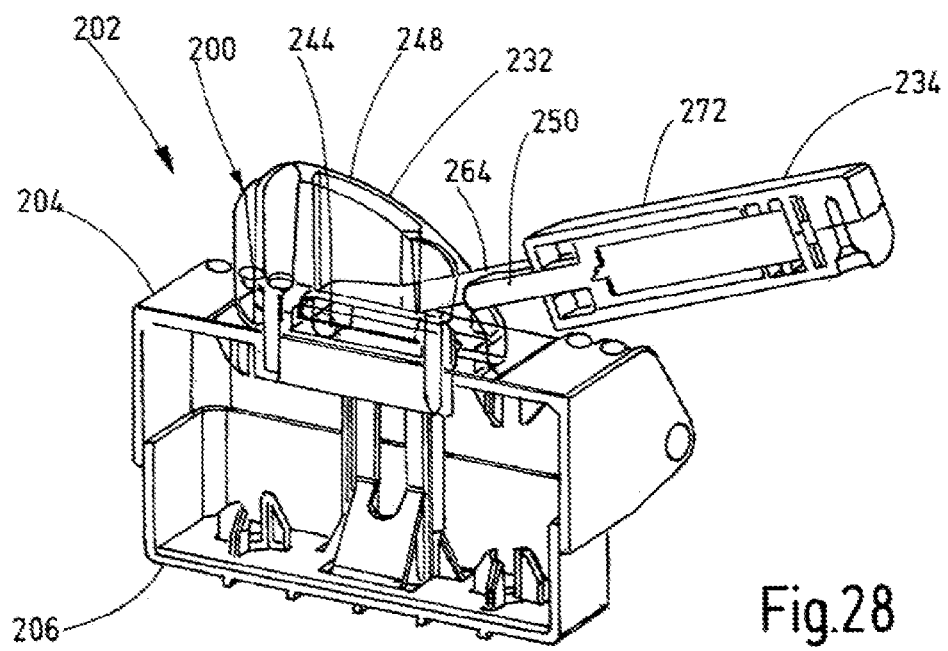
Figure 29:
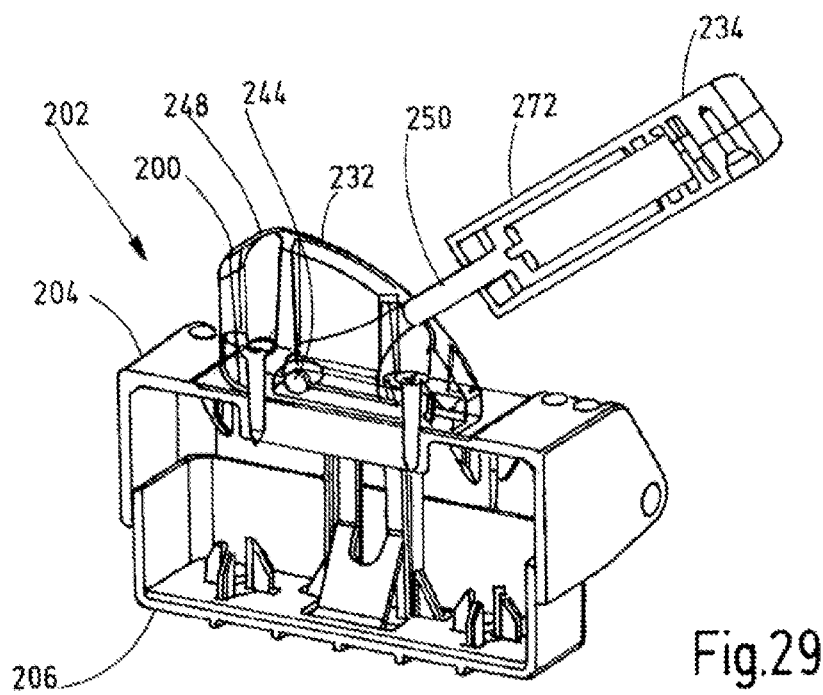
Figure 30:
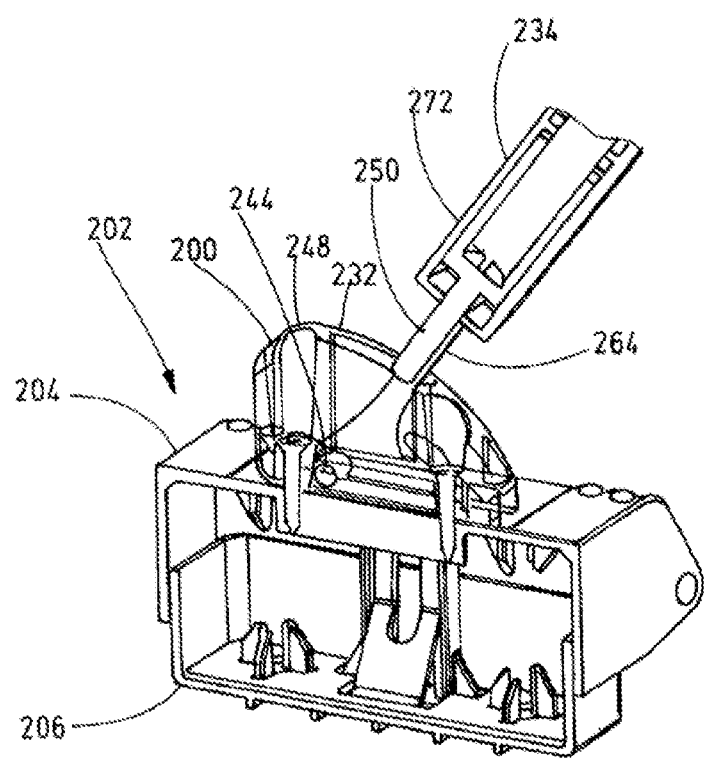
Figure 31:
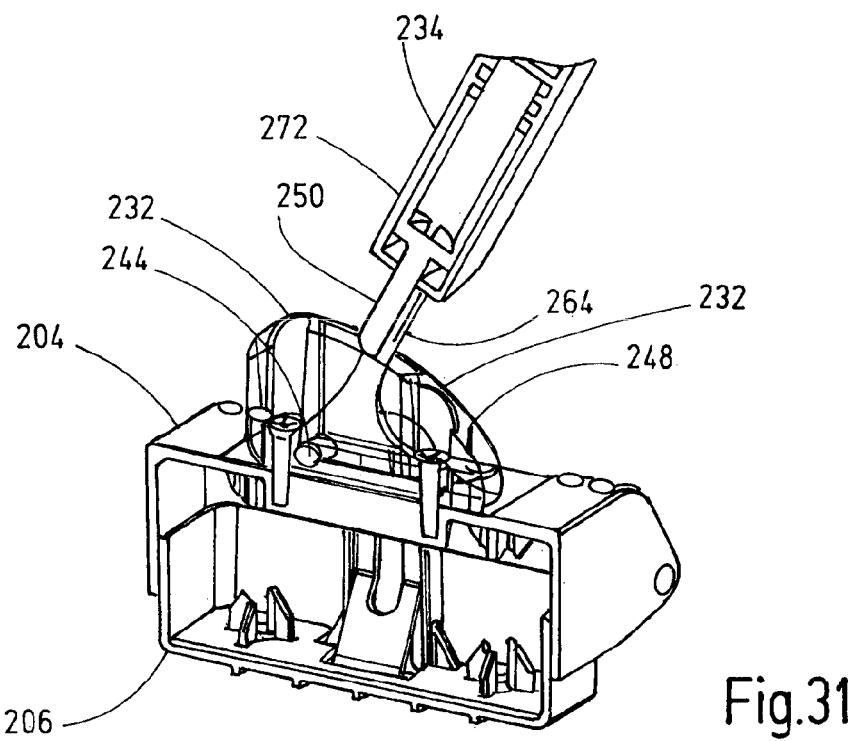
Figure 32:
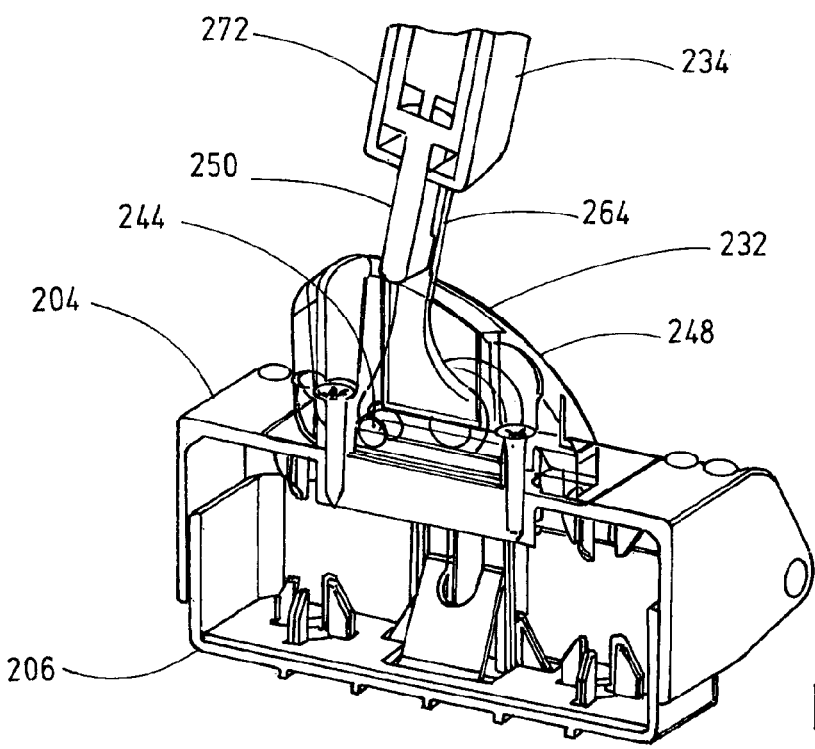
Figure 33:
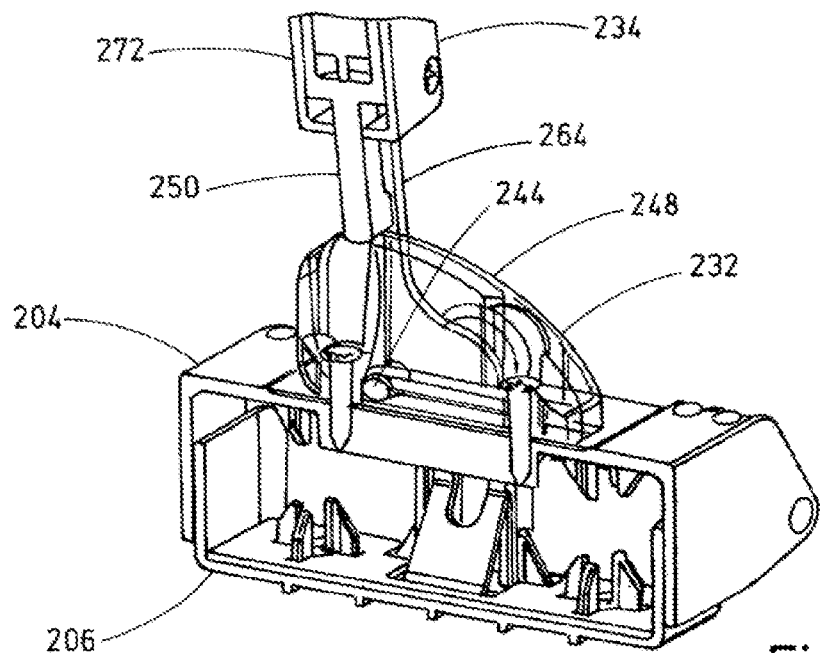
Figure 34:
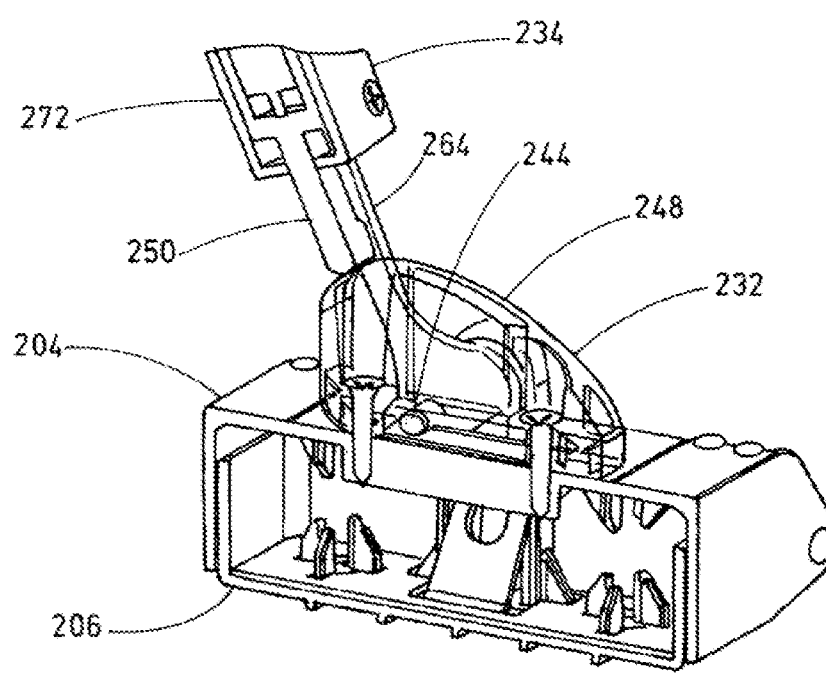
Figure 35:
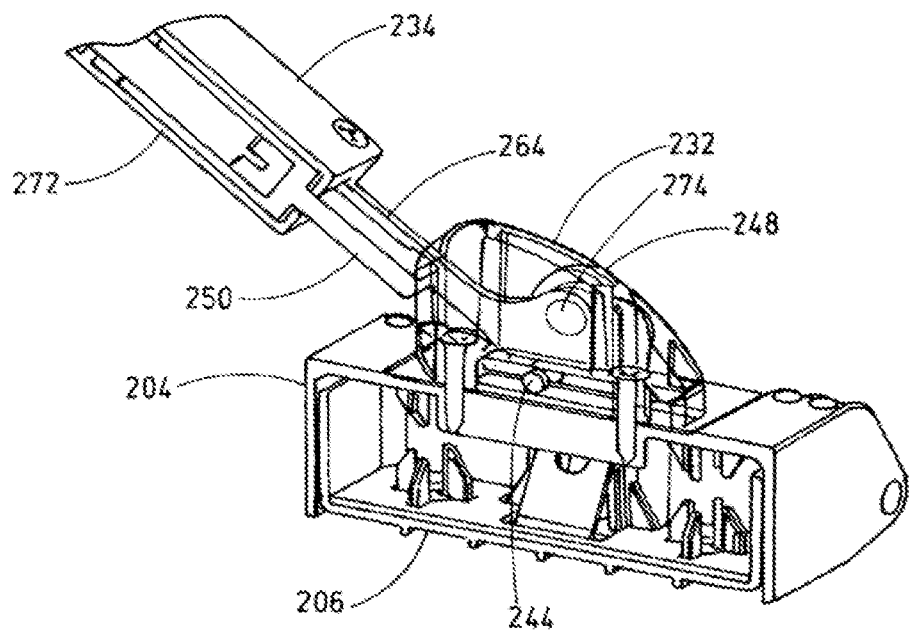
Figure 36:
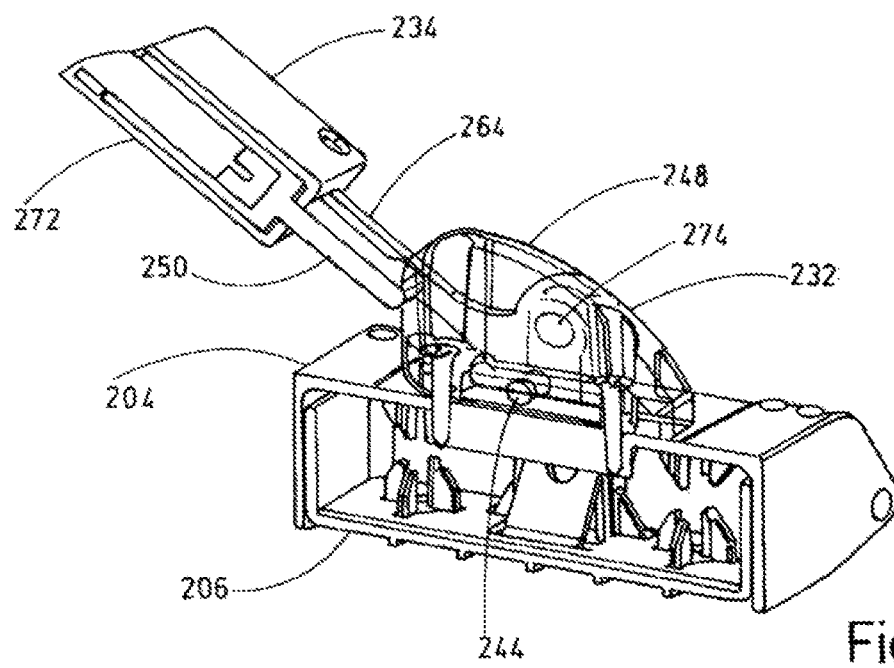
Figure 37:
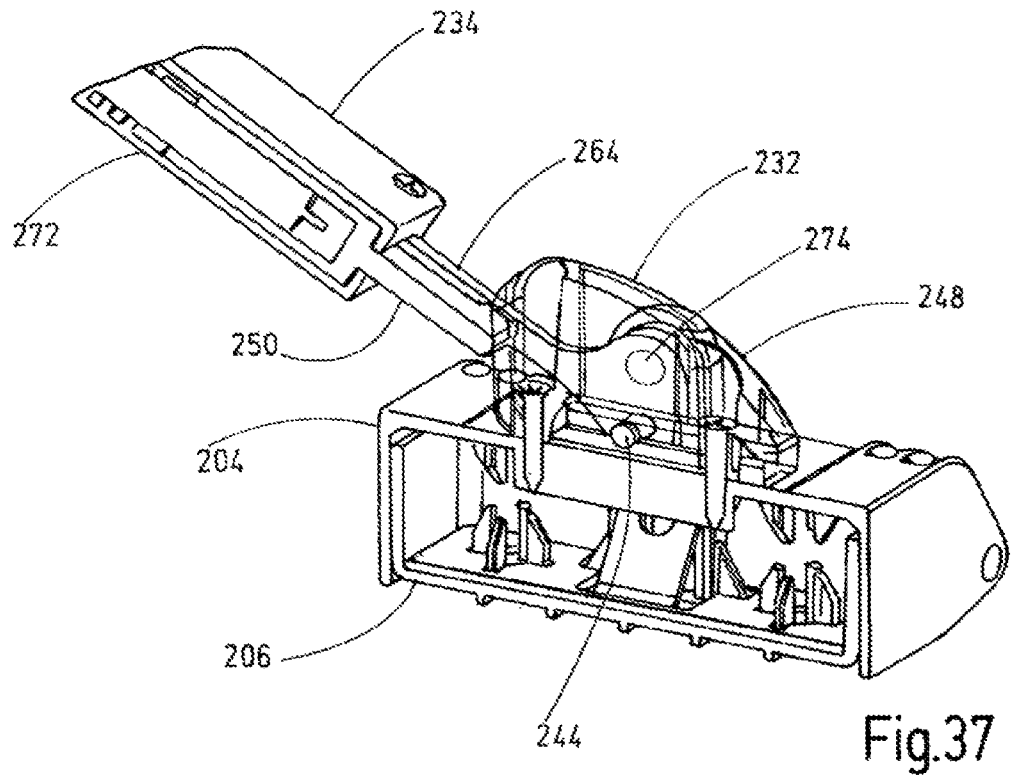
Figure 38:
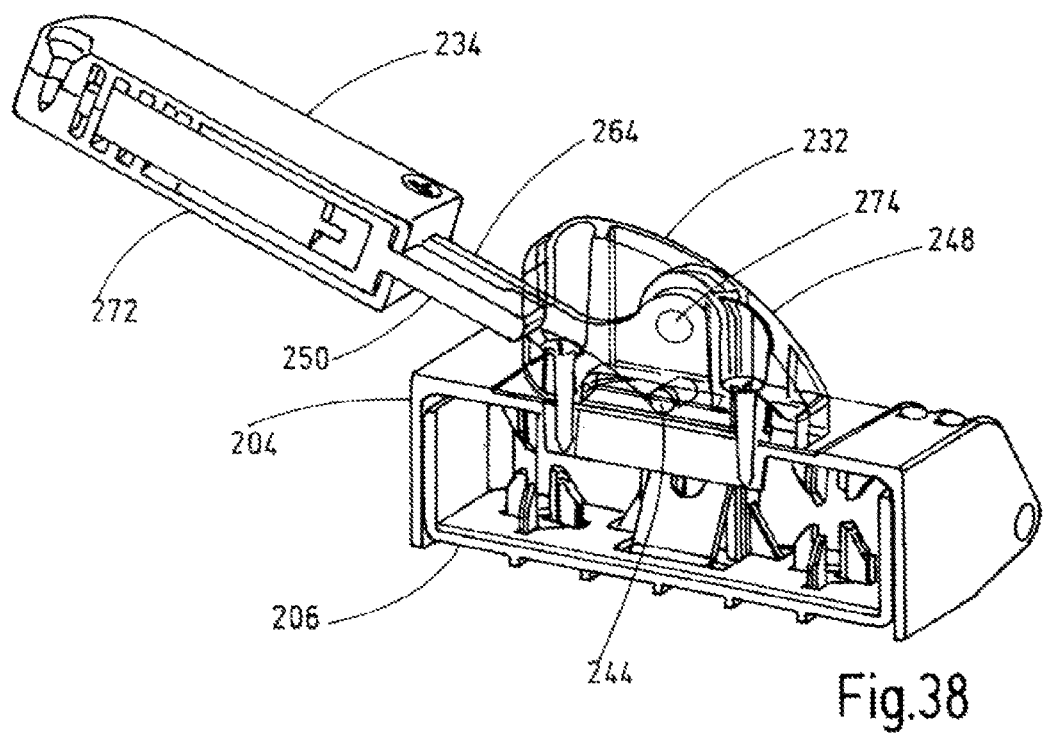
Figure 39:
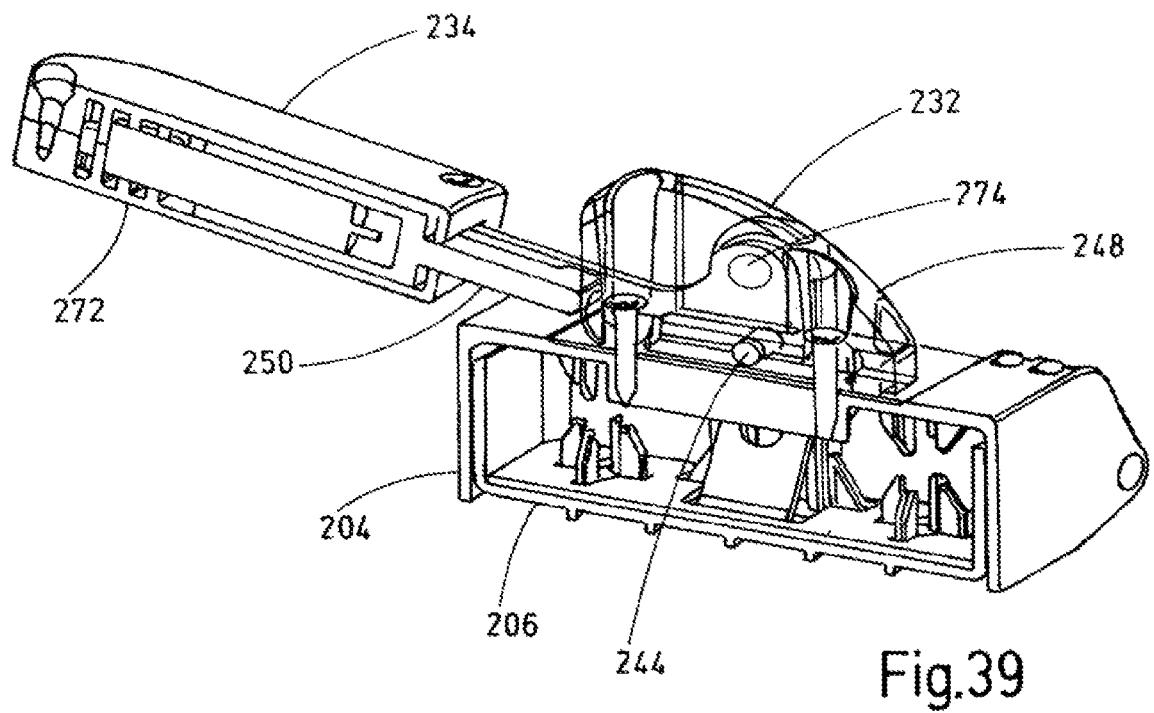
Figure 40:
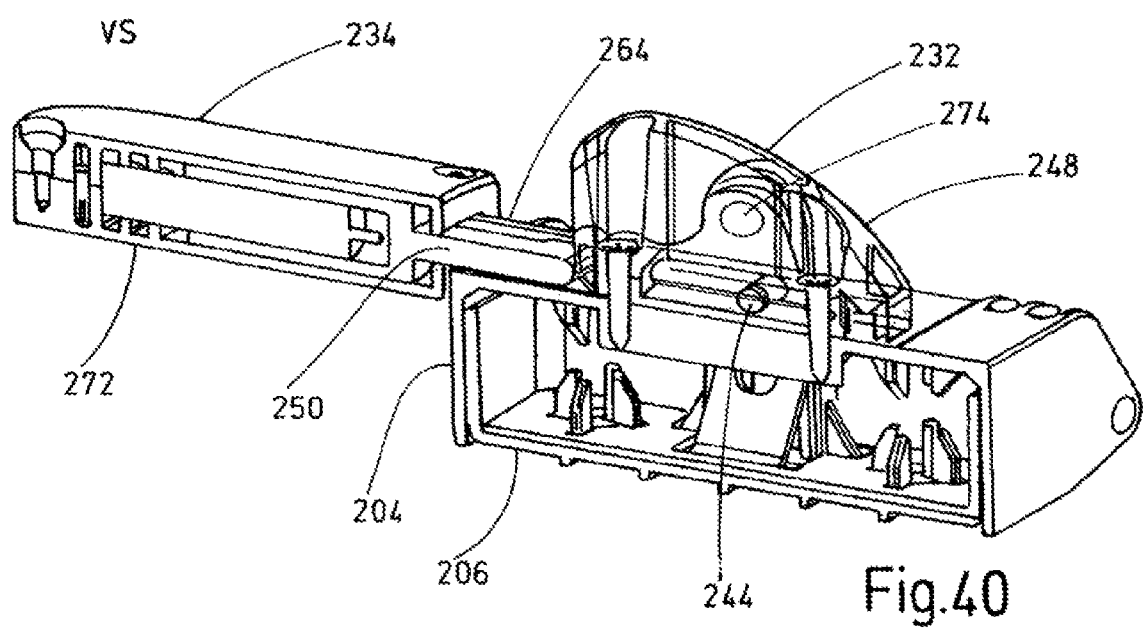

As shown in FIGS. 14 to 16, the cover device 117 has as a main part a shell part 127, which is rectangular and open in the direction of a pressure part, which transmits the retaining force to strand elements to be fixated. This pressure part is formed by a second shell part 129, the shape of which is adapted to the first shell part 127 and which is telescopically movable therein, to enable it to perform, as shown by the comparison of FIGS. 15 and 16, a lifting motion between an extended tensioning position (FIG. 16) and a retracted position, (FIG. 15) wherein the pressure part forming the second shell part 129 can be secured by a locking device or lock. The bottom 131 of the second shell part 129 forms the pusher, which interacts with the strand elements to be fixated by a plate-shaped protective backing 133 abutting against the outside of the bottom 131. The protective backing 133 has an outer contouring having protruding nubs 135. The first shell part 127, the second shell part 129 and the protective backing 133 are injection-molded plastic parts. To generate the tensioning force acting on the second shell part 129, a spring pack of six helical compression springs 137 is provided. One spring is arranged in each corner of the rectangular shape, and one spring each is on the longitudinal center line of the rectangular shape. The compression springs 137 are positioned on pins 139 projecting from the protective base 133 and from the inside of the first shell part 127, is arranged in the interior formed within the shell parts 127, 129.

The locking device, by which the pressure part forming the second shell part 129 can be secured against the action of the spring pack in the retracted position shown in FIG. 15, has an eccentric 141 manually rotatable by a hand lever 431. The eccentric 141 is formed, together with the hand lever 143, by a one-piece plastic part, which part has a cylinder part formed from two circular disks 145 and 147 extending from the hand lever 143 in a cantilevered manner. The circular disks 145, 147 are arranged at a distance from each other. A crank pin 149 is positioned at a location radially offset from the cylinder axis, therefore performs a lifting motion upon rotation of the circular disks 145, 147, and extends through the interstice formed between the circular disks. For transmitting the lifting motion of the crank pin 149 to the pressure part forming the second shell part 129, a connecting rod 151 is provided. Connecting rod 151 engages with or extends in the interstice between the circular discs 145, 147 and has a slot 153 in which the crank pin 149 extends in and engages. The second shell part 129 facing the end of the connecting rod 151 is hinged to a bearing block 155 via a hinge pin 150. The bearing block is formed on the bottom part 131 of the second shell part 129.

FIG. 16 shows the eccentric 141 in a rotational position corresponding to the releasing state of the pressure part, in which the crank pin 149 is located beneath the top side 157 of the pressure part formed by the first shell part 127 and the hand lever 143 rests on the left-hand part of the top side 157. If hand lever 143 is rotated 180° into the rotational position shown in FIG. 15, the hand lever 143 rests on the right-hand side, and the crank pin 149 is in the raised position. The second shell part 129 forming the pressure part is then locked in the retracted position against the spring force applied by the compression springs 137. Shown in FIG. 15, the crank pin 149 is offset laterally relative to the axis of the lifting motion in this rotational position, i.e. in an over-centered position, such that the locking device is secured by the spring force acting in the locked state.

As can be seen most clearly in FIGS. 15 and 16, a circular arc-shaped trough 159 is formed on the top side 157 of the first shell part 127 forming the main part. This trough forms a bearing seat for the rotational motion of the circular disks 145, 147. A cover plate 161 of sheet metal is located on the top side 157 of the first shell part 127. In the central region of cover plate 161, as can be seen in FIG. 14, a rectangular recess 163 is formed and surrounds the trough 159. The longitudinal side edges 165 and 167 of the recess 163 form a lateral guide for the circular disks 145, 147 engaging with the trough 159. The eccentric 141 is then secured in a defined position on the top side 157 in conjunction with the pivot bearing formed by the trough 159.

For the connection to the opening edges 113 and 115 at the insertion opening 111 of the retaining body 101, arms 169 are formed on two opposite sides of the first shell part 127. An interstice between arm 169 permits the engagement of the end portion of the first plate part 103 of the retaining body 101 in that interstice. The pair of arms 169 on the right in FIGS. 12 and 13 is hinged to the first plate part 103 next to the opening edge 115 by a pivot pin 171 (FIG. 14) forming the pivot bearing 119. The other pair of arms 169 is allocated to the latch assembly 121 and has a slot 173, in which a latch bolt 123 of the latch assembly 121 can be moved between a latch position, in which it is latched to the latch hook 125 at the opening edge 113, and a retracted latch position. An actuating spring 175 pre-tensions the locking bolt 123 into the locking position. Spring 175 has, as FIG. 14 shows, a fastening part 177, fastened onto the first shell part 127 beneath the cover plate 161 and a tab 179 at its other end including the central region of the locking bolt 123. As a result, the spring 175 forms an actuating device, generating the pre-tension of the locking bolt 123 and being accessible for manual actuation between the arms 169, as shown in FIG. 12, to permit the retraction of the locking bolt 123 into the unlocked position. FIG. 14 shows that the arms 169 are laterally edged and reinforced by sheet metal parts 185 interconnected by webs 187 and extending in grooves 189 in the top side 157 of the first shell part 127.

FIGS. 17 to 19 illustrate the sequential arrangement of the fastening process for two cables 181. FIG. 17 shows the cover device 117 pivoted into the open position, with the pressure part locked in the retracted position. In the state shown in FIG. 18, the cover device 119 is already in the position closing the insertion opening 111, with the pressure part remaining locked such that no spring force is acting on the pressure part and the pivoting action into the closed position is performed without effort. Finally, FIG. 19 shows the final state, in which the pressure part is released after unlocking the locking device for the tensioning motion and exerts the retaining force on the inserted cables 181.

FIGS. 20 to 40 show a further or third exemplary embodiment of the locking device or lock 200 of a cover device 202 according to the invention. As in the previous embodiments, a shell-shaped main part 204 is provided, in which a likewise shell-shaped pressure part 206 is arranged so as to be telescopically displaceable. The main part 204 and the pressure part 206 are rectangular and four energy storages 208 are provided and space the parts 204, 206 apart from each other.

A bottom plate 210 is inserted in the pressure part 206 for bracing purposes, which bottom plate has recesses for which the energy storages 208 have positioning pins 214. Furthermore, in the interior 216 of the pressure part 206, two necks 218 are arranged in parallel, have slots 220 protruding in the direction of the main part 204 and pass through opening slots 222 of the main part 204.

A recess 224 is provided on the top side 226 of the main part 204 between the slots 222 of the main part 204. A strip-shaped bearing plate 228 is arranged in this recess 224. In addition, the main part 204 has a thickened center part 230 between the slots 222. A guiding part 232 for an actuating lever 234 is provided on the top side 226 of the main part 204. The guiding part 232 is attached to the central part 230 of the main part 204 by two bolts 236 arranged in parallel, which bolts 236 pass through openings 238 in the bearing plate 228. On its underside 240 of guide part 232, there are two lateral stepped recesses 242 on the guiding part 232 for the bearing pin 244 described below. On its top side 246, the guiding part 232 is provided with an asymmetrically shaped, rounded guiding surface 248 for a latch part 250. The guiding surface 248 extends along a left side surface 252 in the image plane and merges via a curve 254 into a bent surface section 256 on the top side 246 of the guiding part 232 and subsequently, via a further curve, 258 into a right side surface 260 of the guiding part 232. The bent central surface section 256 has a maximum height H232 in the vicinity of the left side surface 252 and then extends to the right side surface 260, having a cross-sectional course 262 approximately shaped like a segment of a circle.

Furthermore, the actuating lever 234 is provided. The actuating lever 234 has two wall parts 264 arranged in parallel, extending laterally to the guiding part 232 and pivotally attached to guide part 232. To this end, the wall parts 264 each has a thickened end portion 266 and a drill-hole 268 provided in the longitudinal axis of the wall part 264, in which each drill-hole the bearing pin 244 is fixed. Each thickened end portion 266 is supported on the bearing plate 228 to slide on it, and can be moved in the recess 242 of the guiding part 232. In the end portion 266 another drill-hole 270 is provided eccentrically to the drill-hole 268 for the bearing pin 244 of the respective wall part 264, which drill-hole 270 is located in the axial direction of the wall part 264 between the drill-hole 268 for the bearing pin 244 and an actuating part 272. A lifting pin 274 is fixed in this further drill-hole 270, which lifting pin engages with the slot 220 of the adjacent neck 218 of the pressure part 206 to lift the pressure part 206 against the action of the energy storages 208 and to lock it in the raised position AS.

The actuating part 272 of the actuating lever 234 has two shell parts 276, 278, which are bolted together by bolts 280. The latch part 250 is provided in the center of the actuating lever 234 between the shell parts 276, 278 and the wall parts 264. The latch part 250 is slidably disposed in the longitudinal direction LR of the actuating lever 234 and is acted upon by a further energy storage 282, in particular a gas spring or a helical compression spring arranged in the actuating part 272 in the direction of the guiding surface 248 of the guiding part 232. In addition, the latch part 252 is shaped as a piston and preferably provided with a blind hole 284 for holding and guiding the further energy storage 282.

If the actuating lever 234 is pivoted from an unlocking position ES on the right side in the image plane, in which the pressure part 206 is displaceable relative to the main part 204, to a locking position VS on the left, in which the pressure part 206 is pulled towards the main part 204 and held in this position AS, the latch part 250 is guided along the guiding surface 248 of the guiding part 232. In doing so, it is displaced by the guiding surface 248 in the actuating part 272 against the action of the further energy storage 282. In this case, an operator has to exert an additional force during the pivoting of the actuating lever 234 for an insertion motion. During an extension movement of the latch part 250 from the actuating part 272, the pivoting of the actuating lever 234 is supported in addition to the force applied by the operator. In doing so, frictional forces that occur due to the dragging of the latch part 250 on the guiding surface 248 are neglected.

If the actuating lever 234 is pivoted from the unlocking position ES to the locking position VS, the latch part 250 is first displaced along the right side surface 260 of the guiding part 232, the latch part 250 being displaced a short distance into the actuating part 272. In this way, a resistance has to be overcome to move the actuating lever 234 from the unlocked position ES. Once this resistance has been overcome, the latch part 250 is displaced along the arcuate guiding surface 248 of the guiding part 232. In this pivoting range, the latch part 250 is held in position relative to the actuating part 272 or is, with increasing pivoting angle, slightly displaced into the actuating part 272, such that in this pivoting range either no force or only a very slightly increasing force through the latch part counteracts the pivoting motion of the actuating lever 234. As soon as the maximum height H232 of the guiding part 232 has been exceeded, the falling course of the guiding surface 248 causes the latch part 250 to be pushed out of the actuating part 272 due to the action of the further energy store 282. This causes the actuating lever 234, after having overcome the maximum height H232 of the guiding part 232, to be pivoted solely due to the extension of the latch part 250 further into the locked position VS and to be ultimately held in the locked position VS.

To pivot the actuating lever 234 from the locking position VS to the unlocked position ES, the operator then has to exert a considerably more force to move the latch part 250 along the higher left side surface 252 of the guiding part 232 and push it into the actuating part 272. The latch part 250 is then again at the maximum height H232 of the guiding part 232 inserted to the full extent into the actuating part 272. While the latch part 250 is moved along the arcuate guiding surface 248 of the guiding part 232 in the further course of the pivoting motion of the actuating lever 234, once again the latch part 250 moves little or not at all relative to the actuating part 272, i.e. in this pivoting range, the operator has to exert less force. From the transition to the right side surface 260 of the guiding part 232, the latch part 250 is then again extended a short distance from the actuating part 272. This causes the actuating lever 234 to move the last bit into the unlocked position ES and to be securely held there.

Thus, the cover device 202 has a locking device 200 in this embodiment as well, by which the pressure part 206 can optionally be released against the action of an energy storage 208, against a motion into the tensioning position (locking position VS), or be secured for a tensioning motion (in the unlocked position ES).

While various embodiments have been chosen to illustrate the invention, it will be understood by those skilled in the art that various changes and modifications can be made therein without departing from the scope of the invention as defined in the claims.

The invention claimed is:

1. A device for fixing or guiding strand-shaped elements, the device comprising:
   a retaining body combinable with a carrier structure as a modular fastener;
   a strand accommodation space in said retaining body forming a mounting space capable of receiving one of the strand-shaped elements;
   an aperture in an exterior of said retaining body through which the one of said the strand-shaped elements can be inserted into said mounting space;
   a cover movable between open and closed positions opening and closing said aperture, respectively, said cover including a main member, an energy storage and a pressure application member movable by said energy storage relative to said main member into a clamping position in which a retaining force is exerted by said pressure application member within a clamping range on the one of the strand-shaped elements within said mounting space when cover is in the closed position; and a lock being coupled to said main member and said pressure application member and moving said pressure application member between a secured position restraining movement of said pressure application member relative to said main member by a biasing force of said energy storage and a release position allowing movement of said pressure application member relative to said main member with the biasing force of the energy storage to the clamping position with the movement occurring without engaging the one of the strand-shaped elements.

2. A device according to claim 1 wherein
said energy storage comprises a compression spring; and
said main member is mounted on said retaining body with said pressure application member being movable between the secured position and the release position in the closed position of said cover.

3. A device according to claim 1 wherein
said main member of said cover comprises a first shell component open in a direction towards said pressure application member; and
said pressure application member comprises a second shell component being telescopically movable in said first shell component and having a bottom surface transmitting the retaining force on one of the strand-shaped elements.

4. A device according to claim 1 wherein
said retaining body comprises first and second lateral support members spaced in an axial direction of the one of the strand-shaped elements, said first and second lateral support members having support surfaces for the one of the strand-shaped elements in trough-shaped recesses extending from said aperture.

5. A device according to claim 4 wherein
said retaining body comprises a U-shaped frame with said first and second lateral support members being profile arms extending parallel to one another and being connected by a cross-piece forming a mounting surface capable of attachment to the carrier structure.

6. A device according to claim 4 wherein
said support surfaces of said first and second lateral support members have openings enlarged in steps from bases thereof toward said aperture with inner steps of said openings forming guide surfaces for a clamping movement of said pressure application member and with outer steps of said openings forming connecting steps toward said aperture providing seating surfaces for said cover.

7. A device according to claim 4 wherein
said main member of said cover comprises a shell component open in a direction of said pressure application member, extends from said first lateral support member to said second lateral support member in an axial direction of the one of the strand-shaped elements and has guide tracks on sides of said shell component between said first and second lateral support members; and
said pressure application member comprises attachments guided for movement in said guide tracks of said pressure application members relative to said main member.

8. A device according to claim 7 wherein
said attachments of said pressure application member comprises end portions projecting over a surface of said main member remote from said pressure application member and forming functional elements of said lock.

9. A device according to claim 8 wherein
said lock comprises a manually rotatable eccentric cam rotatably supported on said outer surface of said main member and comprises an eccentric shaft reciprocatably movable relative to said main member when said eccentric cam is rotated, said eccentric shaft being engaged in elongated openings in said attachments of said pressure application member such that said pressure application member is pulled against the biasing force of said energy storage toward said main member in a locking position of said eccentric cam and is released to apply the retaining force in a release position of said eccentric cam.

10. A device according to claim 9 wherein
said first and second lateral support members have mutually projecting hook members at said aperture connected to die recesses formed in said first and second lateral support members, said hook members being able to be passed over during attaching of said cover to said first and second lateral support members, said hook members engaging on said main member and projecting laterally to engage retaining members on said cover.

11. A device according to claim 10 wherein
said retaining elements comprise retaining wings on ends of a cover plate on said main member, said eccentric cam being supported on said cover plate.

12. A device according to claim 7 wherein
said main member of said cover comprises protruding latching lugs at both ends of said sides of said shell component with said guide tracks, said protruding latching lugs engage inside surfaces of said first and second lateral support members in a mounted position of said cover.

13. A device according to claim 1 wherein
said lock comprises a manually rotatable eccentric cam supported on an outer surface of said main member and comprises a crank pin forming an eccentric axis movable in a stroke movement relative to said main member when said eccentric cam is rotated, said crank pin being coupled to said pressure application member by a connecting rod such that said pressure application member is drawn against the biasing force of said energy storage towards said main member in a locking position of said eccentric cam and is released to apply the retaining force in a release position of said eccentric cam.

14. A device according to claim 13 wherein
said eccentric cam comprises a cylindrical portion with a handle projecting radially from said cylindrical portion for manual rotation of said cylindrical position, said cylindrical portion being supported on said outer surface of said main member, said crank pin being spaced radially from a longitudinal axis of said cylindrical portion.

15. A device according to claim 14 wherein
said cylinder portion comprises first and second circular discs spaced from one another, said crank pin being arranged and connected to said connecting rod between said first and second circular discs.

16. A device according to claim 15 wherein
a trough is formed on said outer surface of said main member and mounts said cylinder portion therein;
a cover aperture in a cover plate on said outer surface of said main member in said trough, opposing edges of said cover aperture extending along planes of said circular discs engaging said cover aperture.

17. A device according to claim 13 wherein
said strand accommodating space comprises a U-shaped or V-shaped recess with an inlet opening forming said aperture and having opposing first and second opening edges, said cover being pivotally mounted on said first opening edge for movement between the open and closed position thereof; and
a latch is on said cover releasably lockable in the closed position of the cover at the second opening edge.

18. A device according to claim 17 wherein
said retaining body comprises a bent sheet metal part having a first plate portion with said U-shaped or V-shaped recesses and a second plate portion being at an angle to said first plate portion and forming a mounting surface opposite said inlet opening and being attachable to the carrier structure.

19. A device according to claim 18 wherein
said main member of said cover comprises first and second pairs of arms extending in opposite directions from said main body and being joinable to said first and second opening edges of said U-shaped or V-shaped recesses, respectively, a space between each of said first and second pairs of arms enabling engagement with said first plate portion.

20. A device according to claim 19 wherein
said latch is on said second pair of arms and comprises an elongated hole in each arm of said second pair of arms receiving a locking bolt movable between a latching position latched to a latching hook at said second opening edge and a withdrawn unlatching position disengaged from said latching hook; and
an actuating spring engages and preloads said latching bolt in the latching position and allowing movement of said latching bolt to the withdrawn unlatching position.

* * * * *